US006519050B1

(12) United States Patent
Eintracht et al.

(10) Patent No.: US 6,519,050 B1
(45) Date of Patent: Feb. 11, 2003

(54) CLIENT/SERVER BASED COLOR DENSITY MEASUREMENT SYSTEM

(75) Inventors: Zvika Eintracht, Ramat Gan (IL); Roman Dementiev, Givatayim (IL)

(73) Assignee: RTImage Ltd., Or Yehuda (IL)

( * ) Notice: Subject to any disclaimer, the term of this patent is extended or adjusted under 35 U.S.C. 154(b) by 0 days.

(21) Appl. No.: 09/376,549

(22) Filed: Aug. 18, 1999

(51) Int. Cl.$^7$ .............................................. G06K 15/00
(52) U.S. Cl. ........................ 358/1.15; 358/1.9; 358/2.1
(58) Field of Search ................................ 358/1.9, 1.15, 358/500, 504, 2.1

(56) References Cited

U.S. PATENT DOCUMENTS

| | | | | |
|---|---|---|---|---|
| 4,955,290 A | * | 9/1990 | Kipphan ..................... | 101/183 |
| 5,165,012 A | | 11/1992 | Crandall et al. ............ | 395/100 |
| 5,231,578 A | | 7/1993 | Levin et al. ................ | 367/419 |
| 5,392,400 A | | 2/1995 | Berkowitz et al. .......... | 395/200 |
| 5,426,508 A | * | 6/1995 | Schrammli .................. | 356/402 |
| 5,550,638 A | * | 8/1996 | Ikeda ......................... | 358/296 |
| 5,606,395 A | * | 2/1997 | Yang ........................... | 399/81 |
| 5,671,428 A | | 9/1997 | Muranaga et al. .......... | 395/772 |
| 5,806,079 A | | 9/1998 | Rivette et al. .............. | 707/512 |
| 5,821,931 A | | 10/1998 | Berquist et al. ............ | 345/346 |
| 5,826,025 A | | 10/1998 | Gramlich ................... | 395/200.4 |
| 5,831,615 A | | 11/1998 | Drews et al. ............... | 345/344 |
| 5,832,474 A | | 11/1998 | Lopresti et al. ............. | 707/2 |
| 5,838,914 A | | 11/1998 | Carleton et al. ........ | 395/200.34 |
| 5,847,847 A | * | 12/1998 | Kosaka ....................... | 358/508 |
| 5,860,074 A | | 1/1999 | Rowe et al. ................ | 707/526 |
| 5,870,547 A | | 2/1999 | Pommier et al. ...... | 395/200.35 |
| 5,870,559 A | | 2/1999 | Leshem et al. ........ | 395/200.54 |
| 5,913,205 A | * | 6/1999 | Jain et al. ................... | 707/2 |
| 6,208,770 B1 | * | 3/2001 | Gilman et al. .............. | 382/305 |
| 6,434,272 B1 | * | 8/2002 | Saarelma ................... | 382/224 |

FOREIGN PATENT DOCUMENTS

| | | | | |
|---|---|---|---|---|
| JP | 411296300 A | * | 10/1999 | ........... G06F/3/033 |
| JP | 02000331076 A | * | 11/2000 | ........... G06F/17/60 |

OTHER PUBLICATIONS

Article: Diagnostic Imaging Supplement, Jan. 1999.
Article: Advanced Imaging, Jan. 1999.

* cited by examiner

*Primary Examiner*—Jerome Grant, II
(74) *Attorney, Agent, or Firm*—Howard Zarretsky

(57) ABSTRACT

A client/server system for reading, measuring and displaying color density of documents located on a remote file system accessed over a WAN such as the Internet. The color density information displayed corresponds to specific coordinates of documents that are located on the remote image file servers. The invention provides means for reading, displaying and recording color density measurements of original digital images located on remote image file servers rather than representations of these digital images stored on the user's local computer or LAN. A web server application on the server side functions to capture measurement requests from one or more client applications for measuring, sending, recording and retrieving color density measurements related to specific positions of specific documents located on an image filer server. On the client side a client software application functions to display the document that the user wishes to read color density information from and provides the tools necessary to permit the user to measure, send, record and retrieve color density measurements. Additional information regarding spot colors and position in a digital color book can also be displayed as requested by the user. Further, the user can record the results of the color density measurement by pressing an annotation button in the color densitometer window. In response, a note containing the color values is created and placed over the document.

44 Claims, 14 Drawing Sheets

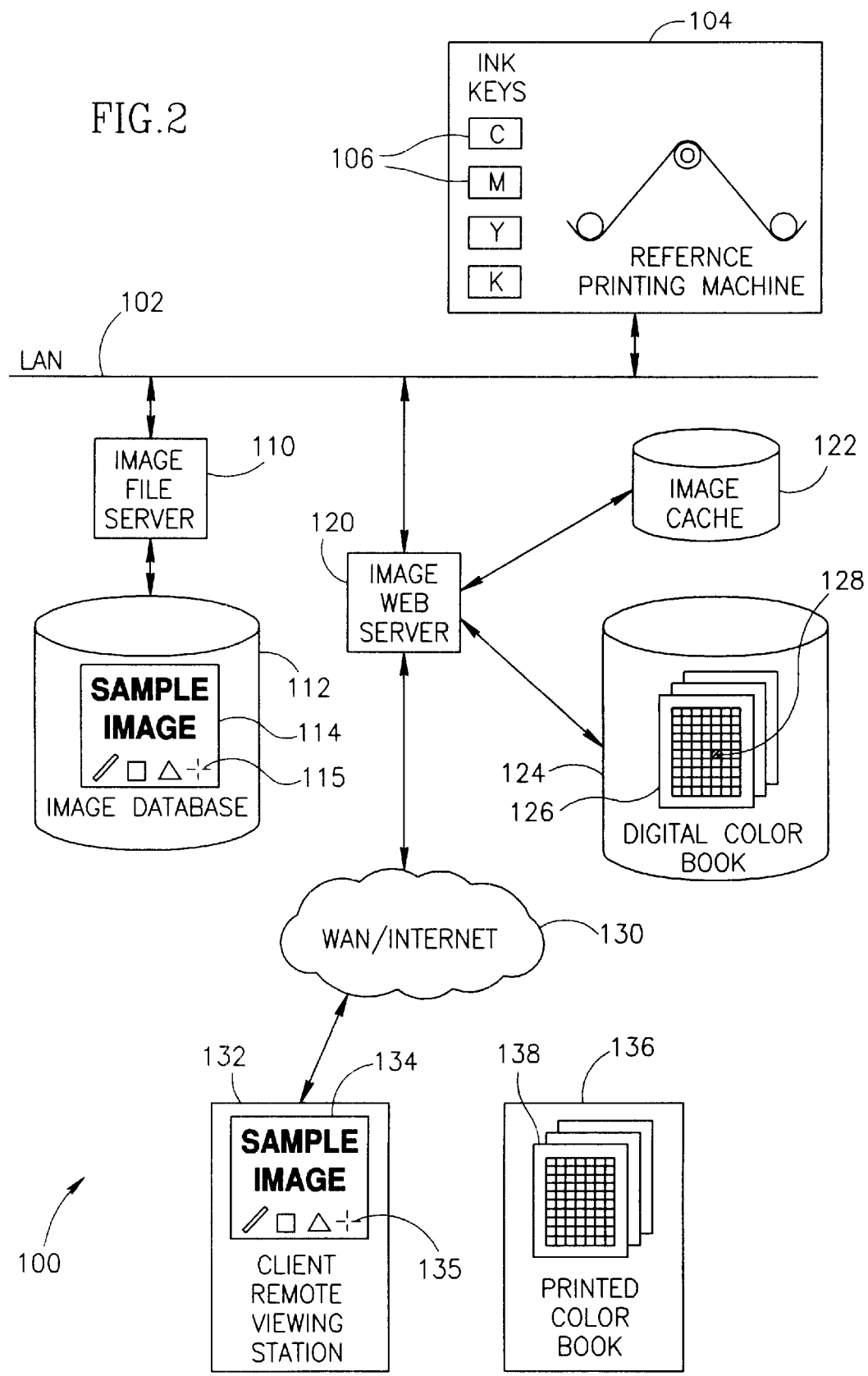

CLIENT DENSITOMETER EVENT DATA STRUCTURE

CLIENT DENSITOMETER MEASUREMENT REQUEST STRUCTURE

FIG. 7

SERVER DENSITOMETER RESPONSE DATA STRUCTURE

| | |
|---|---|
| DOCUMENT ID | 292 |
| LOCAL SERVER TIME | 294 |
| DOCUMENT DIMENSIONS | 296 |
| NUMBER OF MEASUREMENTS | 298 |
| MEASUREMENT #1 | 300 |
| COLOR BOOK ENTRY #1 | 301 |
| ⋮ | |
| MEASUREMENT #N | 302 |
| COLOR BOOK ENTRY #N | 304 |

CLIENT DENSITOMETER MEASUREMENT REPLY STRUCTURE

| | |
|---|---|
| SERIAL NUMBER | 312 |
| MEASUREMENT TIME STAMP | 314 |
| ACTION | 316 |
| ANCHOR | 318 |
| STATUS | 320 |
| PROCESS COLOR | 322 |
| PROCESSOR COLOR TRANSPARENCY MASK | 324 |
| NUMBER OF SPOT COLORS | 326 |
| SPOT COLOR LINK #1 | 328 |
| ⋮ | |
| SPOT COLOR LINK #N | 330 |

310

Y=0% K=10%

| C / M | 0% | 10% | 20% | 30% | 40% | 50% | 60% | 70% | 80% | 90% | 100% |
|---|---|---|---|---|---|---|---|---|---|---|---|
| 0% | | | | | | | | | | | |
| 10% | | | | | | | | | | | |
| 20% | | | | | | | | | | | |
| 30% | | | | | | | | | | | |
| 40% | | | | | | | | | | | |
| 50% | | | | | | | | | | | |
| 60% | | | | | | | | | | | |
| 70% | | | | | | | | | | | |
| 80% | | | | | | | | | | | |
| 90% | | | | | | | | | | | |
| 100% | | | | | | | | | | | |

CLIENT/SERVER BASED COLOR DENSITY MEASUREMENT SYSTEM

FIELD OF THE INVENTION

The present invention relates generally to a client/server system for measuring and displaying color density of documents (including images) located on remote file servers wherein access occurs over a local or wide area network such as the Internet based World Wide Web (WWW).

BACKGROUND OF THE INVENTION

A basic function of World Wide Web browsers in common use today, such as Netscape Navigator and Microsoft Internet Explorer, is to allow web pages stored on a remote Web server to be retrieved and viewed. The user initiates a viewing session on a web browser by specifying a particular URL corresponding to a page to be viewed. The web server transmits the various elements of the requested page to the browsing application. Any special data formats, e.g., video, audio, certain images, documents not written in HTML language, etc., are treated by one or more web browser software plug-ins on the client computer.

A common need is to be able to view digital images on the client computer and be able to read, display and record color density measurements over wide area networks or the Internet. The digital images are stored on image servers located somewhere in the network and are not stored on the user's local computer. In addition, it would be useful if the system were able to aid the user in interpreting the color measurement readings to match a specific printing system with a particular color book. Note that the users of the system may be located anywhere in the world as long they have a connection to the wide area network, e.g., the Internet.

In the printing and graphic arts industry, printed color is measured utilizing tools known as densitometers. Color is measured for many reasons, a major reason being to calibrate printers used in the printing process so that the printed color can be matched to an original item or a known standard. When the printed data is still in digital form it is common practice in the printing and graphic arts fields to measure color values in the digital image by means of software that functions to emulate the physical device for measuring color, the software being typically provided with the image editing and display systems.

This electronic densitometer allows the gray level of each of the color components to be measured at a specific coordinate location in the image. The measured color values may be expressed in the form of component color values, e.g., cyan (C), magenta (M), yellow (Y) and black (K), for each color component, i.e., separation, present in the measured color image. Alternatively, the measured color values may be expressed as composite color space vectors that represent the color space coordinates of the measured color at a location being measured. The color space vectors are color space coordinates within a system-independent coordinate system such as CIE XYZ or L*, a*, b*.

Spot colors, i.e., special colors, such as gold, silver or those used in color systems like Pantone® or Toyo may also be represented. Since the computer based video display systems represent the image using the RGB color space, it is far more preferable to measure color using the original color channels from the digital image file. This ensures that the correct values are presented to the user, i.e., before they are converted to RGB.

A problem arises, however, when a digital image is subject to color space transformations such as a conversion from the CMYK color space to CIELab or RGB. When conversions are used, it is highly likely that the resulting densitometer readings are not the same as they would be using the original color data. This is due to the fact that the color values are rounded during the conversion calculations introducing errors and that the transformations themselves are not reversible.

The problem is further compounded when the images are compressed before being transmitted to the client workstation over a network such as a WAN or the Internet. In this case, it is difficult to measure color on images that are compressed because the color space of the images typically changes as part of the compression algorithm. Thus, color information cannot be reliably or accurately measured at the client site receiving the compressed images.

In addition, a problem with current systems is that the color viewed on the screen is not sufficient to provide accurate density data on the underlying image. The ability to measure color of an image displayed on screen is very useful when working with an image that is ultimately to be printed. In the pre-press phase of generating printed images, it is very helpful to be able to measure the spot color of an image in any desired location. This information is used in conjunction with a color book to view the actual colors that will be printed when the image goes to press.

In currently available imaging systems, however, color density readings are made directly from an off-screen memory that is located within the user workstation where the image is viewed. Thus, the off-screen memory in the user image workstation holds the entire original image that may be 10, 50, 100 MB or more. Alternatively, the original images are located on a file system wherein both the file system and the image workstation are connected to a high speed local area network. In the case where off-screen memory is used to store the original image, color readings are made directly from the off-screen memory where the image is stored. In the case where a file system connected to a LAN is used to store the image, color readings are made directly from the image file server.

An example of a commercially available product is widely used Adobe Photoshop® application program. This software program incorporates a digital color densitometer feature that functions to read color values at a specific coordinate of the image. This tool, however, reads the pixel color value information from off screen memory that holds a copy of the original image.

In another example, the Scitex Prismax retouching workstation is an image processing workstation designed for the graphic arts industry. The workstation incorporates a digital color densitometer that functions to read and display color component values at a specific image coordinate. Unlike Adobe Photoshop, however, this system samples the original image that resides on an image file server connected to a LAN.

A disadvantage of the prior art densitometer systems is that they are not suitable for use with large images where the user image workstation and the original image are either not co-located in the same device or are not connected by a high speed LAN. In particular, the prior art systems are not practical for use with user image workstations that are connected to image file servers over low rate connections such 28.8, 33.6 or 56 Kbps dial up access over the Internet.

In addition, the prior art systems are not client/server solutions whereby multiple users can simultaneously access the same image. Further, these systems do not permit users to work directly with printing press references such as reference color books. Some prior art systems compress the image in memory so that the image takes up less memory to store or the image is decompressed with the result that the decompressed image is not the same as the original. In this case, color densitometer readings are not from the original image but from some altered version of the original image.

For example, in prior art systems color density measurements are taken from a local frame buffer containing color data in RGB color space. The color data is converted into CMYK values using one of several well-known conversion techniques for converting color from the RGB color space to CMYK. This process, however, is not accurate due to the conversion between color spaces that is required.

In addition, it would be desirable to record densitometer readings as annotations on the image itself for use by others. More than one densitometer reading should be able to be displayed over the image. Others viewing the document would then be able to view the densitometer notes as well. Prior art systems do not permit a user to record multiple densitometer readings and have them displayed with the image itself along with the ability to share them with other viewers.

Thus, there is a strong felt need for a densitometer system that is client/server based and able to measure color density at any point in the original image and display the readings on the user image workstation and to display any associated color book information in addition thereto.

SUMMARY OF THE INVENTION

The present invention is a client/server system for reading, measuring and displaying color density of documents (including images) located on a remote file system and accessed over a WAN such as the Internet. The color density information displayed corresponds to specific coordinates of documents located on the remote image file servers. The invention provides means for reading, displaying and recording color density measurements of digital images that are not stored on the user's local computer. The invention allows for measuring color using a compressed version of a document where the color values displayed on screen are not accurate and may or may not be stored in off-screen memory. Note that the system of the present invention is also suitable for use with black and white images as well as color. References to color images throughout this document are intended to encompass black and white images as well.

The invention can be implemented as software, a portion of which executes on the server side and a portion executes on the client side. The server side may comprise a plurality of software applications running in parallel that in combination provide the server functionality of the invention. A web server application on the server side functions to capture special requests from one or more client applications for measuring, sending, recording and retrieving color density measurements related to specific positions of specific documents located in the image filer server.

The color density information is transmitted between client and server applications via TCP/IP protocols over communications means such as a LAN, WAN or the Internet. The invention may be adapted to operate over an Intranet, e.g., LAN, or Extranet, e.g., WAN or the Internet.

On the client side a client software application functions to display the document that the user wishes to read color density information from and provides the tools necessary to permit the user to measure, send, record and retrieve color density measurements. Note that the client software application can be implemented as a web browser plug-in module. The plug-in contains the user interface for navigating within the document and for handling the color density measurements.

A color densitometer button is provided which, when pressed by the user, displays the densitometer floating window for showing the measurements. For example, when the user presses the left mouse button at a specific image coordinate on the screen, the server measures the color density value at the corresponding coordinate in the original document file. The color density information is transmitted back to the client and subsequently displayed in the floating densitometer window.

The client is capable of receiving the color density information in any one of a various number of color spaces. Additional information regarding spot colors and position in a digital color book can also be displayed as requested by the user. Further, the user can record the results of the color density measurement by pressing an annotation button in the color densitometer window. In response, a note containing the results, i.e., the color values, is created and placed over the image in the same location as the-color density reading.

A synchronization button is also provided which, when pressed by the user, transmits any previously recorded color density measurement annotations generated by the user from the client to the server using a suitable communications protocol. In response, the server transmits back an acknowledgement along with any new record notes that other clients may have posted since the last synchronization was performed.

Multiple users may measure color density of a document at the same time. Each individual user may measure color density values of many documents at the same time. This is achieved by the user opening several web browser windows, one for each document color density measurements are to be taken.

In accordance with the invention, the color density measurement readings are transmitted from the server independent of the data transmitted that is related to the viewed document The server first checks that a user is authorized before replying with color measurements. At the client side, the client application layers the color measurement reading records over the document (image) in accordance with the coordinates of each.

A key feature of the present invention is the ability of a user to refer to a printed color book which the user can use to match image colors displayed in RGB color space on the computer monitor screen with the CMYK image colors subsequently produced by the target printing process. The server functions to provide the exact location of the measured color in the particular color book being used. Using the same digital source file, i.e., digital color book, one or more color books may be printed. Each color book represents a single instance of a variety of different printing machines, color inks, paper stock and varying printing conditions. Any number of color books can be used at the client side for reference purposes by a user. Thus, the invention helps in interpreting the color density readings to match the nuances of a specific printing system by means of a color book.

As result, the present invention has the advantage of permitting multiple clients to measure, send, record and retrieve color density information of a document. This is achieved by measuring the color density values of documents that reside on a centralized web server. Note that the multiple clients perform color density measurements on one or more documents in an asynchronous fashion.

When color density annotations are posted to the server by a client, the state of the annotation database stored therein is synchronized such that all other clients can retrieve the current, up to date color density annotations associated with a document.

The densitometer measurement system of the present invention is applicable to numerous types of fields including the printing and graphic arts industry, medical industry and graphical information systems (GIS). It is also applicable to professionals in various fields including, for example, color printers (e.g., offset, gravure, flexo), service bureaus, graphic designers, doctors, cartographers and illustrators, trade shop personnel and anyone having a need to verify the correctness of colors and/or measure and verify colors in a document displayed on the monitor screen. In addition, in order for a user to specify changes in color to portions of a document, it is necessary to be able to retrieve the original color values in the original digital image.

The present invention functions to retrieve the color density information directly from the original document itself without requiring any conversions from one color space to another, e.g., RGB to CMYK. It is important to point out that the densitometer system of the invention does not read color data from a local off-screen buffer or from a file that is local to the system or client computer. Rather, the invention is operative to read and retrieve color density information from the original document file via a WAN such as the Internet. The invention is intended to operate over WAN links that may be relatively slow, e.g., 28.8, 33.6, 56 or 64 Kbps.

There is thus provided in accordance with the present invention a client/server based color density measurement system comprising an original document stored in a document file in an image database on a server coupled to a network, the document file for storing a digital representation of a document, one or more clients coupled to the network, each client operative to locally display a representation of the original document remotely stored on the server in the document file, the client adapted to permit a user to measure color density of the original document at a specific coordinate location and the server operative to measure color density information from the original document in response to a request received from a client over the network, the server sending via the network the results of the color density measurement to the client for display to the user.

The system further comprises means for measuring and displaying color density information relating to spot colors and their CMYK equivalent used within the original document, means for recording color density measurement results in a note subsequently associated with the original document file, means for calculating an entry in a color book whereby a color patch in the color book is selected that corresponds to the color density measurement results returned by the server.

The server and the client comprise means for measuring color density information of an original document that has not yet been fully displayed by the client. The server is adapted to vary the number of pixels used to measure the color density in accordance with the ratio between the number of pixels displayed on a monitor associated with the client and the corresponding number of pixels in the original document stored on the server. The client is adapted to display the results of the color density measurement with an indication that the result is not accurate in the event the zoom factor is other than 1:1. The client is adapted to display an indication of the transparency of a particular color separation or element of the document.

The client comprises a computer display monitor, network communication means, a processor suitably programmed to run a web browser application and a client plug-in adapted to run within the web browser, the client plug-in operative to locally display a representation of the original document remotely stored on the server in the document file and to permit a user to measure and display color density of the original document at a specific coordinate location.

The server comprises network communication means, a processor suitably programmed to provide web server services, provide densitometer agent services and to measure color density information from the original document in response to a request received from a client over the network, the server sending via the network the results of the color density measurement to the client for display to the user.

The system server is adapted to receive the color density measurement requests from the one or more clients and respond to the requests utilizing the Hypertext Transport Protocol (HTTP). The system further comprises security means for providing Universal Resource Locator (URL) translation and redirection services so as to provide user level security for documents and notes stored on the server.

There is also provided in accordance with the present invention, in a client/server system coupled to a network, a method of measuring the color density of a document comprising the steps of storing an original document as a digital representation of a document in a document file in an image database on a server coupled to a network, displaying locally a representation of the original document remotely stored on the server in the document file on a client wherein one or more clients are coupled to the network, accepting a request from a user to measure color density of the original document at a specific coordinate location, the server measuring color density information from the original document in response to the request received from a client over the network, the server sending via the network the results of the color density measurement to the client for display to the user.

The method further comprises the step of measuring and displaying color density information relating to spot colors and their CMYK equivalent used within the original document, the step of recording color density measurement results in a note subsequently associated with the original document file, the step of the client calculating an entry in a color book whereby a color patch in the color book is selected that corresponds to the color density measurement results returned by the server and the step of the server calculating an entry in a color book whereby a color patch in the color book is selected that corresponds to the color density measurement results returned by the server.

The step of displaying locally a representation of the original document on the client comprises transmitting either a non-compressed or a compressed document from the server to the client.

BRIEF DESCRIPTION OF THE DRAWINGS

The invention is herein described, by way of example only, with reference to the accompanying drawings, wherein:

FIG. 2 is a block diagram illustrating an example of the client/server densitometer system of the present invention operating over a WAN;

FIG. 7 is a diagram illustrating the Server Densitometer Response Data Structure in more detail;

FIG. 8 is a diagram illustrating the densitometer measurement reply structure of the Server Densitometer Response Data Structure of FIG. 7 in more detail;

FIGS. 10A and 10B are charts illustrating an example page from a color book used in conjunction with the client image workstation;

DETAILED DESCRIPTION OF THE INVENTION

Notation Used Throughout

Figure 1A:
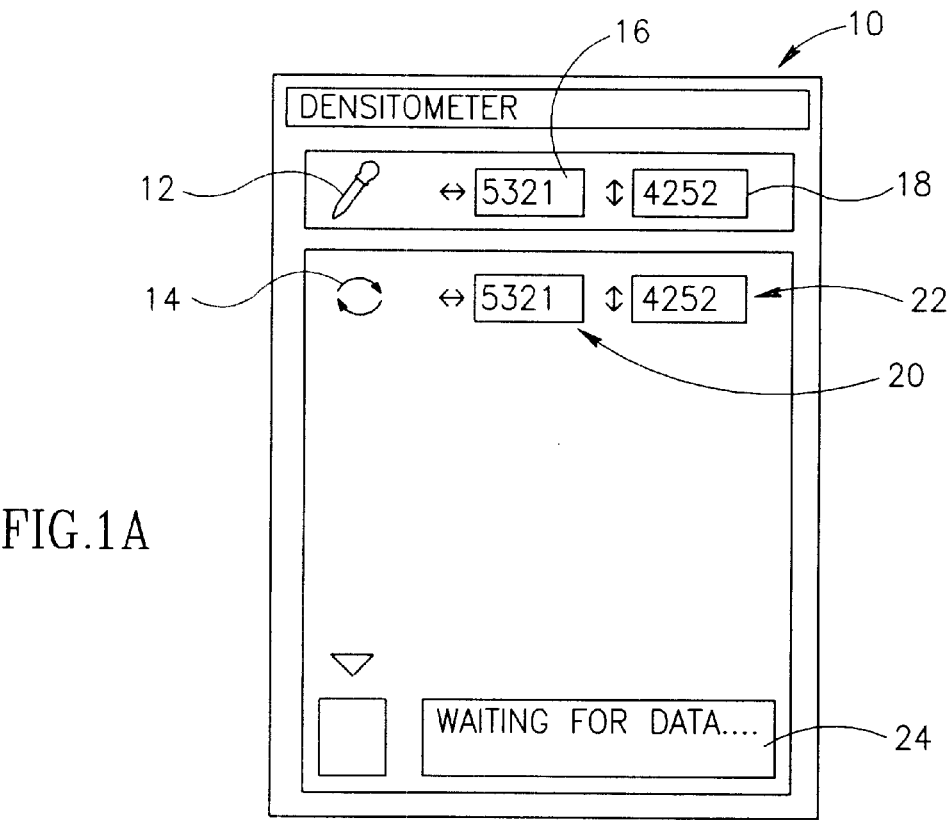
FIGS. 1A, 1B, 1C, 1D are illustrations of example displays generated by an application program incorporating the densitometer system of the present invention.

The following notation is used throughout this document.

| Term | Definition |
| --- | --- |
| BMP | Windows operating system native raster image format |
| CIE | Commission International de l'Eclairage - a device independent color space and standard |
| CMYK | Cyan, Magenta, Yellow, Black - subtractive primary printing colors |
| GIF | Graphic Interchange Format |
| GIS | Graphical Information Systems |
| GUI | Graphical User Interface |
| HLS | Hue, Luminance (Lightness), Saturation - a popular color model |
| HTML | Hypertext Text Markup Language |
| HTTP | Hypertext Transport Protocol |
| IIS | Internet Information Server |
| IP | Internet Protocol |
| ISAPI | Internet Server Application Programming Interface |
| JPEG (JPG) | Joint Photographic Experts Group - color image compressed file format standard |
| LAN | Local Area Network |
| MIME | Multipurpose Internet Mail Extension |
| NFS | Network File System |
| PDF | Portable Document Format |
| RGB | Red Green Blue |
| SQL | Structured Query Language |
| TCP | Transport Control Protocol |
| TIFF | Tag Image File Format |
| URL | Universal Resource Locator |
| WAN | Wide Area Network |
| WWW | World Wide Web |

The following terminology and definitions apply throughout this document.

| Term | Definition |
| --- | --- |
| Color Density | The term Color Density denotes the degree of darkness of an image area. The color density is normally sampled for all color components of an image such as Cyan, Magenta, Yellow and Black components. The color density may be measured at a pixel level or may be the result of averaging color readings of more than one pixel. |
| Document | The term document denotes a file that may contain text, images or a combination of both. |
| Resolution | The number of pixels per unit of measurement. Note that the image on screen is typically 72 dpi. This is regardless of the zoom factor. |
| Zoom Factor | The resolution of the image currently being displayed on the screen versus the resolution of the document in the document file on the image file server. |

General Description

The present invention is a client/server system for reading, measuring and displaying color density of documents located on a remote file system accessed over a WAN such as the Internet. The color density information displayed corresponds to one or more pixels at specific coordinates of documents located on the remote image file servers. Each document displayed is measured independently of other documents and can be annotated independently with color density measurement results. The invention is suitable for use with most types of documents that can be displayed on a computer monitor screen. Examples include JPG, BMP, GIF and TIFF image formats.

The invention can be implemented as software, a portion of which executes on the server side and a portion executes on the client side. The server side may comprise a plurality of software applications running in parallel that in combination provide the server functionality of the invention. A web server application on the server side functions to capture special requests from one or more client applications for measuring, sending, recording and retrieving color density measurements related to specific positions of specific images located in the image filer server. The invention also optionally incorporates a notes server which functions to log all annotation activities along with information about the corresponding clients that create, edit and retrieve them.

Illustrations of example displays generated by an application program incorporating the densitometer system of the present invention are shown in FIGS. 1A, 1B, 1C and 1D. The system of the present invention is suitable for use with a variety of image file types. The description of the invention presented herein is applicable to any type of document. It is assumed that for any particular document format type chosen, it's underlying format is known and that the client and server are adapted with the necessary means to read and write image pixel data for that image format. Thus, it is intended that the choice of image format does not limit the scope of the invention. One skilled in the computer and software art can apply the system of the present invention to any desired image format type.

FIG. 1A shows the densitometer floating window display that is generated when the densitometer tool provided in the client web browser is activated. The densitometer tool can be activated only after a document is displayed. Once a document is displayed, the user can measure color density values at specific coordinates of the image by activating the densitometer tool that may comprise an icon displayed on a menu bar in the client web browser.

Once the tool is activated by pressing on the icon, the densitometer window 10 is displayed on the screen. The user moves the computer cursor to a point on the monitor screen within the document where the color density is desired to be measured. As the user moves the cursor, the X, Y image coordinates of the cursor are displayed continuously in positions 16, 18, respectively, next to the eye dropper icon 12. These X, Y values are updated to reflect any cursor movement the user makes. After choosing a point on the screen to measure color density, the user clicks the left mouse button.

At that point, the X, Y image coordinates corresponding to the cursor location at the moment of the left click are frozen and displayed in positions 20, 22, respectively, next to the 'in process' indication icon 14. The cursor coordinates are then transmitted to an image web server that reads the original document at the corresponding file cursor position. The message 'Waiting for data . . . ' is displayed in a status box 24 in the lower portion of the window 10.

Figure 1B:
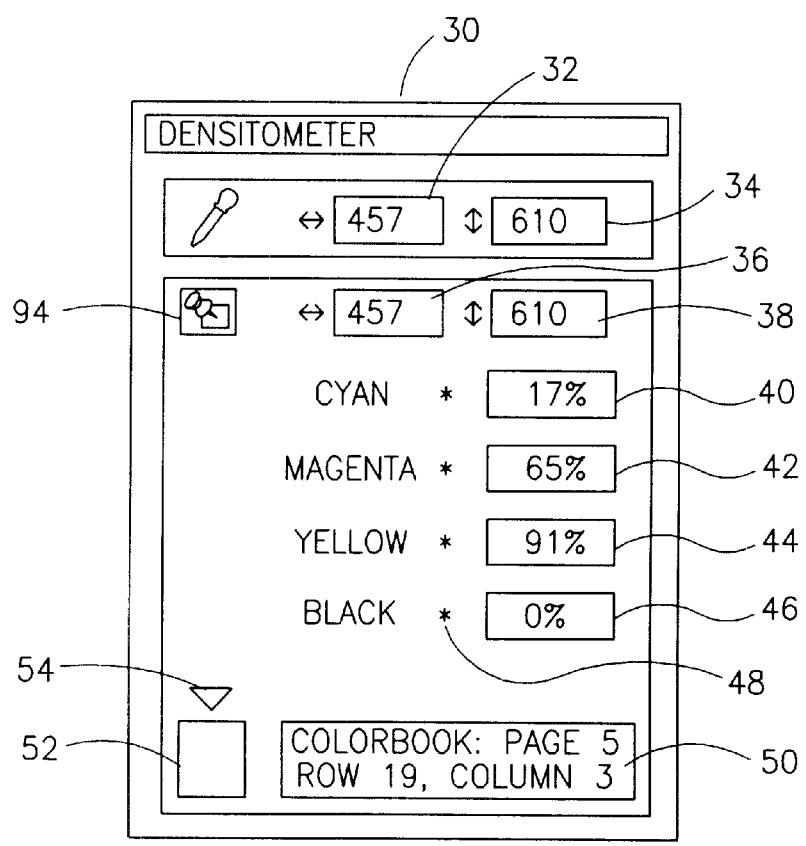

The image web server then reads the color values from the original document on the file server and then searches to find the location of the resultant specific color in the digital color book. The color value readings along with the position in the color book are then transmitted and displayed on the densitometer window 30 as shown in FIG. 1B. The window 30 comprises the current X, Y position of the cursor in positions 32, 34, respectively. The coordinates displayed are continuously changing. The X, Y coordinates chosen for color density measurement are displayed in positions 36, 38, respectively. The color density data returned by the image web server is displayed in positions 40, 42, 44, 46, labeled Cyan, Magenta, Yellow, Black, respectively.

If the color density readings cannot be accurate due to coordinate rounding or averaging effects, an asterisk indication 48 is displayed. In addition, if the measured color exists in the color book in use, the color box 52 displays the particular color and the corresponding position in the color book is displayed in box 50. The data displayed includes, for example, the name of the color book, page number, row and column.

Figure 1C:
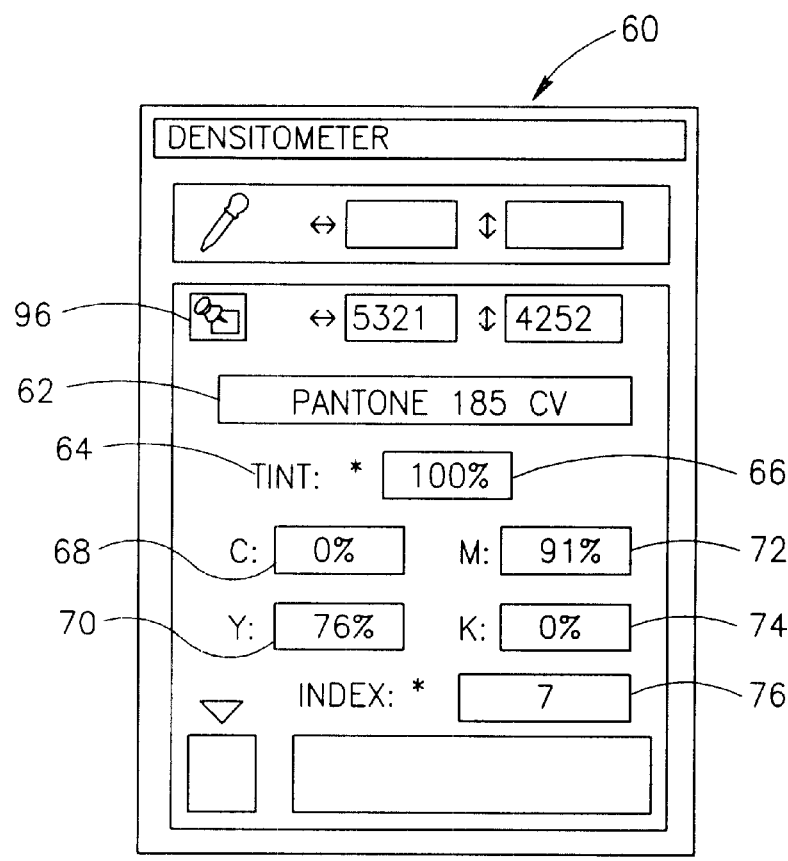

If the color density readings indicate that the color is a spot or special color ink, a slightly different densitometer window 60 is displayed as shown in FIG. 1C. As in densitometer windows 10 and 30, the X, Y coordinates of the current cursor position are displayed next to the icon of the eye dropper. These coordinates are varied continuously with the user's movement of the mouse or cursor positioning device.

Once the user chooses a coordinate by clicking the left mouse button, the X, Y coordinates chosen are displayed directly below the continuously changing coordinates. The spot color box 62 displays the name of the color ink, i.e., the color system, and its density is displayed in density box 66. If a color density measurement cannot be accurate because of coordinate rounding or averaging effects, an asterisk indication 64 is displayed as well. If the image web server is able to retrieve the process color equivalents of the particular spot color, these values are also displayed in boxes 68, 72, 70, 74, which are labeled C, M, Y, K, respectively. The index into a color table that may exist in the original color document is displayed for reference purposes in box 76. Note that displaying this index is useful for certain types of documents such as lineart document file formats.

As shown in FIGS. 1B and 1C, once the color density data is returned from the image web server, the processing arrows icon 14 is replaced with an optional annotation icon 94, 96. When this icon button is pressed, and the optional annotation subsystem is operative, an annotation (note) window is created automatically. The annotation window is created with the coordinates of the color density readings along with a copy of the color measurement values themselves. This is illustrated by the sample note 80 shown in FIG. 1D. The note 80 comprises a title bar optionally containing the user's name and time and date of the reading, the X, Y coordinate position 84 of the reading and the color density readings like CMYK values 86, 88, 90, 92. The asterisks indicate that the results may not be exact due to coordinate rounding and averaging effects. The color readings may not be accurate if the zoom factor is other than 1:1.

Client/Server Densitometer System

A block diagram illustrating an example of the client/server densitometer system of the present invention operating over a WAN is shown in FIG. 2. The system, generally referenced 100, comprises a client portion and a server portion. The client portion comprises a client remote viewing workstation 132 and optionally a printed color book 136 for reference by the user. The server portion comprises an image file server 110, document database 112, image web server 120, image cache 122 and digital color book 124. A LAN 102 image file server 110 and the image web server 120. Note that the document database 112 may comprise any suitable database for storing documents (including images). In one embodiment, the documents may be stored as a file system stored on a disk drive.

In addition, a printing press 104 is shown optionally coupled to the LAN 102. Alternatively, the printing press may operate stand alone. The image web server 120 communicates with the client workstation 132 via a Wide Area Network (WAN) 130 such as the Internet. The color density information is transmitted between client and server applications via TCP/IP protocols over communications means such as LAN, WAN or the Internet 130.

The current cursor position 115 is shown only to illustrate the location in the original file of the pixel that corresponds to the request for color density measurement on the screen 134 on the client workstation 132. The server does not maintain the same cursor position in the image file as that shown on the screen.

On the client side the client software application running on the client remote viewing workstation 132 functions to display the document the user wishes to read color density information from and provides the tools necessary to permit the user to measure, send, record and retrieve color density measurements. Note that the client software application can be implemented as a web browser plug-in module or as a Java applet. Note that references to a browser plug-in in this document encompass Java applets as well. The plug-in contains the user interface for navigating within the document and for handling the color density measurements.

A color densitometer button is provided which, when pressed by the user, displays the densitometer floating window for showing the measurements. For example, when the user presses the left mouse button at a specific image coordinate on the screen, the server measures the color density value at the related coordinate in the original document file. The color density information is transmitted back to the client and subsequently displayed in the floating densitometer window.

The client is capable of receiving the color density information in any one of a various number of color spaces.

Additional information regarding spot colors and position in a digital color book can also be displayed as requested by the user. Further, the user can record the results of the color density measurement by pressing an annotation button in the color densitometer window. In response, a note containing the results, i.e., the color values, is created and placed on top of the image in the same location as the color density reading.

A synchronization button is also provided which, when pressed by the user, transmits any previously recorded color density measurement annotations generated by the user from the client to the server using a suitable communications protocol. In response, the server transmits back an acknowledgement along with any new record notes that other clients may have posted since the last synchronization was performed.

Multiple users may measure color densities within a document at the same time. Further, each individual user may measure color density values of many documents at the same time. This is achieved by the user opening several web browser windows, one for each document from which color density measurements are to be taken.

In accordance with the invention, the color density measurement readings are transmitted from the server independent of the data transmitted that is related to the viewed document At the client side, the client application layers the color measurement reading records over the document in accordance with the coordinates of each.

A key feature of the present invention is the ability of a user to refer to a printed color book which the user can use to match image colors displayed on the computer monitor screen with the image colors subsequently produced by a target printing process. The server functions to provide the exact location of the measured color in the particular color book being used. Note that using the same digital source file, i.e., digital color book, one or more color books may be printed. Each color. book representing a single instance of a variety of different printing machines, color inks, paper stock and varying printing conditions. Any number of color books can be used at the client side for reference purposes by a user.

As a result, the present invention has the advantage of permitting multiple clients to measure, send, record and retrieve color density information of a document. This is achieved by measuring the color density values of documents that reside on a centralized web server. Note that the multiple clients perform color density measurements on one or more documents in an asynchronous fashion.

When color density annotations are posted to the server by a client, the state of the annotation database stored therein is synchronized such that all other clients can retrieve the current, up to date color density annotations associated with a document.

Densitometer System Architecture

Figure 3:
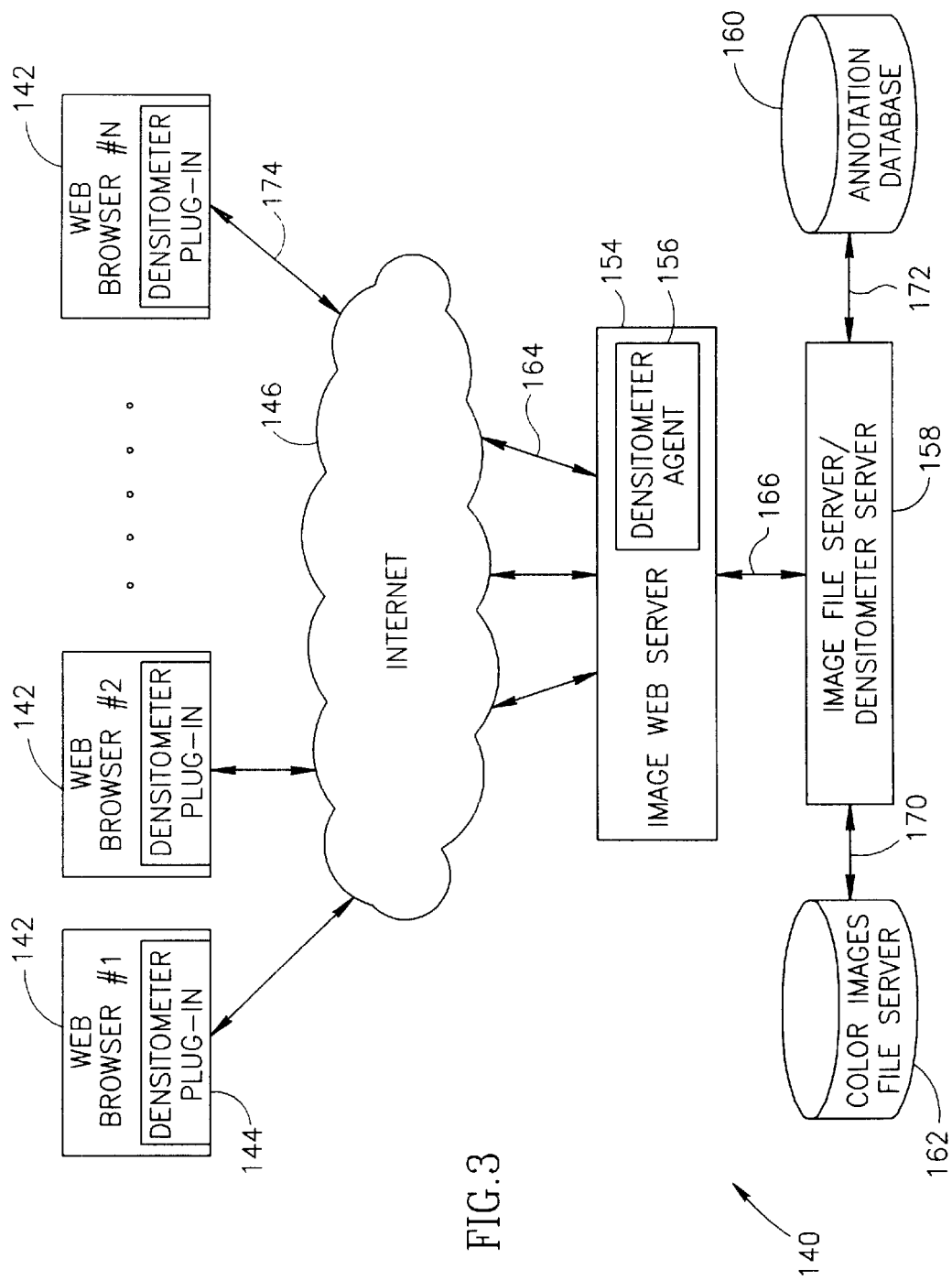
FIG. 3 is a block diagram illustrating the architecture of the densitometer system of the present invention.

A block diagram illustrating the architecture of the densitometer'system of the present invention is shown in FIG. 3. The densitometer system, generally referenced 140, comprises one or more web browsers 142 labeled web browser #1 through web browser #N wherein each incorporates a densitometer plug-in 144, WAN or Internet 146, image web server 154 incorporating a densitometer agent 156, image file server/densitometer server 158, color image file server 162 and an annotation database 160.

For illustration purposes, the invention is described in the context of a web browser at the client workstation and one or more web servers on the server side. Note, however, that the invention can be implemented using any suitable means including, but not limited to, stand alone clients that implement the same functionality without the use of a web browser and/or plug-in software component. For example, the client may be implemented as a stand alone application communicating via TCP/IP to the server. The server itself is not limited to implementation as a web-server. The server may comprise a general server adapted to listen on a well-defined TCP/IP port and respond to the specific client/server protocol.

The web browser may comprise any suitable standard web browser such as Netscape Navigator or Microsoft Internet Explorer. Each web browser comprises a Densitometer Plug-In component that loads into the browser. Each web browser in combination with the Densitometer Plug-In functions as a Densitometer Client and is the tool used for measuring color density of image documents located on the server side. The Densitometer Plug-In is invoked each time the browser gets a response from the Image Web Server 154 with a particular Multipurpose Internet Mail Extension (MIME) identifier. The communication protocol between Densitometer Clients (web browser within remote client workstations) and the web image server 154 (links 174, 164) and between the Densitometer Server 158 and Image Web Server 154 (link 166) is standard Hyper Text Transport Protocol (HTTP). The web browsers are adapted to communicate over a global TCP/IP network such as the Internet 146 or any other WAN/LAN type network.

The server portion of the system 140 comprises an image web server 154 with integrated Densitometer Agent 156, Image File Server/Densitometer Server 158 coupled to an optional Annotation Database 160 and an Image Document File Server 162. The Densitometer Server 158 communicates with the Annotation Database 160 via any suitable database language/protocol such as SQL (link 172). The Densitometer Server communicates with the Image File Server 162 via standard NFS or equivalent (link 170).

In operation, a remote user accesses the web server from the remote viewing station 132 (FIG. 2) in order to browse the contents of the image database 112 via the image file server 110. The user makes a request to display a document 114 from the image database 112 within the web browser window within the client remote viewing station 132 by specifying the appropriate URL. Note that partial views of the document may be stored in an optional image cache 122. When a request is received for a document, the image web server first checks to see if the document is already present in the cache. If it is, the document is streamed from the cache. If it is not found in the cache, the document is retrieved from the image database 112 via the image file server 110.

If the document is retrieved from the image file server it is first converted by the image web server for transmission over the Internet 130. One of the steps during the conversion process may include compressing the document. The compression may comprise any suitable standard compression technique well known in the image or data processing arts. The processed document is transmitted to the remote client workstation and stored in the image cache 112.

Once the document 143 is displayed, the user may measure color density values at one or more specific coordinates of the document by activating the densitometer tool (via icon or other suitable means) in the web browser. In response, the densitometer display window is activated (GUI window 10 in FIG. 1) and the user then moves the computer cursor 135 on the screen to a specific point and presses the left mouse button.

The document coordinates are continuously displayed on the densitometer tool as described previously. Any movement of the cursor 135 causes the coordinates displayed to be updated. Once the user presses the left mouse button, the cursor position coordinates are preserved and transmitted to the image web server 120, which in turn reads the document 114 at the corresponding position of the file cursor 115. The densitometer server then attempts to find the location of the specific color in the digital color book 124 (color position 128, for example). The color value readings, the position 128 in the color book and optionally information from the document file header are transmitted back to the remote client workstation 132 via the WAN 130. Note that both the client request for color density measurements and the reply from the web image server can be encoded and transferred by means of the Hypertext Transport Protocol (HTTP).

Once the information arrives at the remote client workstation 132 from the image web server 120, it is displayed in the densitometer window (GUI window 30 FIG. 1). Each color separation value is associated with a separate slot or box. The values can be displayed either as a percentage or in system values, e.g., 0 to 255 or 0 to 65535. If the values are not exact because of coordinate rounding effects, an asterisk is displayed next to the value. If the measured color is found in the color book, the color is displayed along with the corresponding position in the color book.

If the document contains spot colors, the name of color, e.g., Pantone 185 CV, is displayed along with its density. If the image web server can determine the process color equivalents of the spot color, these values are displayed as well.

Note that a key motivation for measuring the color density of the original document is that the colors displayed on most computer monitors do not match the colors that will ultimately be printed on the printing press. The typical monitor does not accurately display the true colors of the document. This is due to limitations in the phosphors, display electronics in the monitor, limitations in the video display adapter in the computer, etc. Even if a monitor is calibrated and adjusted to accurately display color, the accuracy deteriorates over time requiring frequent and bothersome calibrations to maintain accuracy. Note also that computer monitors display colors in RGB color space while high end imaging systems separate the image into CMYK values. The color space of the printing process is in CMYK and not RGB that contributes to the inaccuracies of the RGB image displayed on the monitor.

As described previously, the present invention provides the user with the ability to create annotations containing the results of a color density measurement. The annotation system functions may be performed on the same platform as the image file server/densitometer server 158 or can be provided by a separate computing entity. In either case, the annotation database 160 is used to store annotation related data. The resulting note window can be saved at the server to serve as a recording of the color density measurement. This is performed by the optional annotation subsystem described in more detail in U.S. application Ser. No. 09/270,255, filed Mar. 15, 1999, entitled "COLLABORATIVE DOCUMENT ANNOTATION SYSTEM," similarly assigned and incorporated herein by reference.

Color Measurement Method

Figure 4:
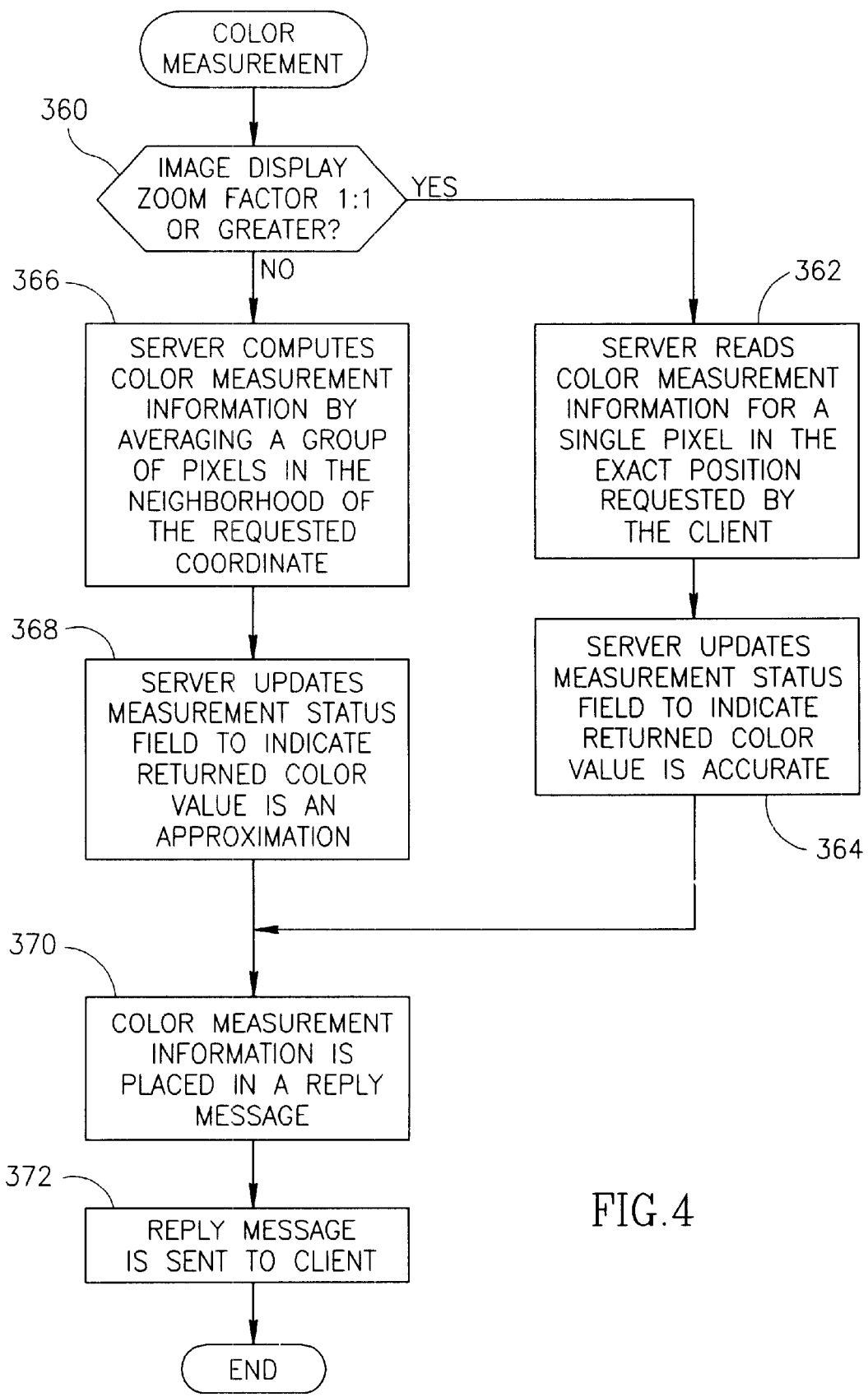
FIG. 4 is a flow diagram illustrating the color measurement method of the present invention.

The color measurement method of the present invention will now be described in more detail. A flow diagram illustrating the color measurement method of the present invention is shown in FIG. 4. As described above, if the color density information returned from the image web server is not exact due to coordinate rounding, an asterisk is displayed next to the results. This may occur depending on the resolution of the document currently being displayed on the monitor versus the resolution of the document in the image document file on the image file server. The relationship between these two resolutions represents the zoom factor or zoom level. Whether or not an accurate color density measurement can be performed depends on the resolution of the document displayed on the monitor. If the zoom level chosen by the user is low enough then it is likely that each pixel of the on screen image represents more than one pixel in the original document in the image database. As the user zooms in, a point is reached where a one to one relationship exists between pixels displayed on the screen and pixels in the original document file.

First, the server checks the document display zoom factor that is supplied with the color density measurement request message whether it is 1:1 or greater ratio (step 360). A ratio of 1:1 or greater between screen and original document file is achieved when the user continues zooming into the document such that a point is reached whereby a pixel on the screen is at a resolution equal to or higher than the original document. If the color density measurements requested are for (1) pixels on the monitor that correspond one to one to pixels in the original image file or for (2) several pixels on the monitor that correspond to one pixel in the original document file, then the server reads color measurement information for a single pixel (i.e., picture element) in the exact coordinate position requested by the client (step 362). The server then adds an indication in the measurement status field within the measurement reply message to indicate that the returned color value is accurate (step 364).

In accordance with the invention, zoom factors of 1:1 and greater are handled the same way. When the client zooms higher and higher into a document, a point is reached where several pixels on the screen represent the same pixel on the original document. Therefore, there is no need to further average pixels.

If the color density measurements requested are for a pixel on the screen that corresponds to more than one pixel in the original document file (a ratio less then 1:1), then the server computes color measurement information by averaging a group of pixels in the neighborhood of the requested coordinate (step 366). A ratio of less than 1:1 between the screen and original document files is achieved when the user continues zooming out such that a point is reached whereby a pixel on the screen is at a lower resolution than the original document. In this case, the color density measurement information is obtained by applying some form of interpolation or averaging of the pixels within the neighborhood of the requested coordinate. Alternatively, the server may choose the closest pixel in the document file to represent the density of the image at the specified point. In this case, the server notifies the user accordingly of the approximation.

The number of pixels included in the computation varies according to the zoom factor or, in the alternative, by the default settings supplied by the user. For typical applications, averaging either 3×3 or 5×5 pixels is sufficient, whereby the choice of resolution is determined based on the zoom factor or by default user settings. The server then adds an indication in the measurement status field within the measurement reply message to indicate that the returned color value is an approximation (step 368).

In both cases, the color measurement information is then placed in the appropriate field within the measurement reply message that is generated by the server (step 370). Once complete, the reply message is sent to the client over the WAN/Internet (step 372). If the color density measurements are exact, they are displayed without asterisks. In all other cases where pixels on the monitor correspond to more than one pixel in the original image, the color density measurements are taken by combining color density information from all the pixels corresponding to the screen coordinate chosen by the user. Any suitable technique may be used to combine the color density information such as averaging the individual values.

In an alternative embodiment, the server is adapted to compute and measure other types of data, not only color density information, related to pixels (or the average of groups of pixels) at a particular coordinate in the original image. This includes, for example, (1) the de-screening of bitmap images so as to obtain color density information at a specific location; (2) color space conversion adapted to reveal the process colors (or spot color equivalents) in other useful color coordinate systems such as HLS, LAB, etc.; and (3) for images that comprise a combination of elements that lie one on top of the other, e.g., a Scitex page that has continuous tone and Linework elements, the server is adapted to return transparency and visibility information of elements at the specific location.

Client Densitometer Event Data Structure

Figure 5:
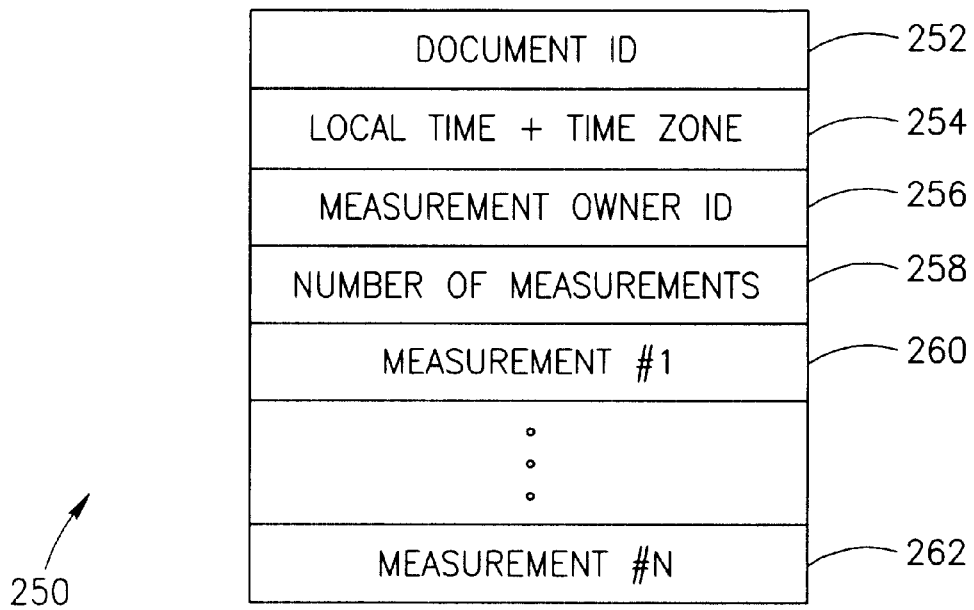
FIG. 5 is a diagram illustrating the Client Densitometer Event Data Structure in more detail.

A diagram illustrating the Client Densitometer Event Data Structure in more detail is shown in FIG. 5. The data structure, generally referenced 250, comprises a plurality of fields for conveying densitometer data from the Densitometer Client to the Densitometer Server. The data structure comprises a Document ID field 252 which comprises the URL of the document the measurements are associated with, local time 254 of the client along with the time zone of the client, the Measurement Owner ID 256 which uniquely identifies the user and the number of measurements 258 contained in the message. Following the number of measurements is a buffer containing one or more measurements labeled measurement #1 260 through measurement #N 262.

Figure 6:
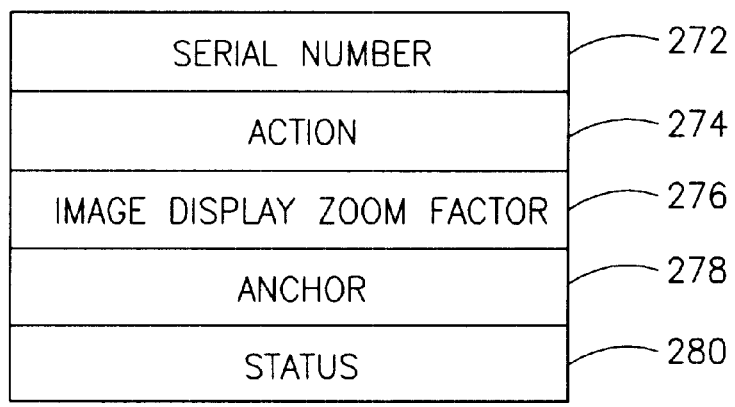
FIG. 6 is a diagram illustrating the densitometer measurement request structure of the Client Densitometer Event Data Structure of FIG. 5 in more detail.

A diagram illustrating the densitometer measurement request structure of the Client Densitometer Event Data Structure of FIG. 5 in more detail is shown in FIG. 6. The data structure, generally referenced 270, comprises a plurality of fields that are used by the client to represent each measurement request. Each measurement comprises a Measurement Serial Number 272 field uniquely identifying the measurement. The Measurement Serial number is set to zero for a new measurement and set to a non-zero value for an existing measurement. A measurement action field 274 represents the action to be taken on the measurement. The following values are valid actions.

| 0 | No action |
|---|---|
| 1 | Measure color |

An image display zoom factor field 276 represents the exact zoom factor of the image displayed on the screen on the client workstation. In particular, the image display zoom factor is the ratio between the number of pixels that the client displays on the screen and the number of pixels in the original image on the image server. Note that the ratio need be measured on one axis only (assuming the client preserves the display aspect ratio of the axis).

A Measurement Anchor field 278 stores the coordinates of the position of the measurement in the image. The measurement status field 280 can have the following values.

| 0 | Ignore |
|---|---|
| 1 | To be performed |
| 2 | Done |

Server Annotation Response Data Structure

A diagram illustrating the Server Densitometer Response Data Structure in more detail is shown in FIG. 7. The data structure, generally referenced 290, comprises a plurality of fields for conveying note data from the Densitometer Server to the Densitometer Client. The data structure comprises a Document ID field 292 which comprises the URL of the document the measurements are associated with, local server time 294, the dimensions of the document 296 including the width and height in millimeters and the resolution of the width and height in pixels per millimeter and the number of measurements 298 contained in the message. Following the number of measurements field is a buffer containing one or more measurements and entries in the color book. The measurements are labeled measurement #1 300 through measurement #N 302 and the color book entries are labeled color book entry #1 301 through color book entry #N 304. Each color book entry comprises page, column and row. Note that in the event the client calculates the color book entry, these fields are not required.

A diagram illustrating the densitometer measurement reply structure of the Server Densitometer Response Data Structure of FIG. 7 in more detail is shown in FIG. 8. The data structure, generally referenced 310, comprises a plurality of fields that are used by the server to represent each measurement reply. Each note comprises a Measurement Serial Number 312 field uniquely identifying the measurement. The Measurement Serial number is set to zero for a new measurement and set to a non-zero value for an existing measurement. The Measurement Time Stamp field 314 represents the time (in server time) of the update for this particular measurement. An action field 316 represents the action to be taken on the measurement. The following values are valid actions.

| 0 | No action |
|---|---|
| 1 | Measured |

A Measurement Anchor field 318 stores the X, Y coordinates of the position of the measurement in the document The measurement status field 320 can have the following values.

| 0 | Ignore |
|---|---|
| 1 | Accurate measurement |
| 2 | Non-accurate measurement |

The setting of this field was described in more detail hereinabove. The process color field 322 represents the process color values, i.e., the CMYK process color values measured from the original image.

The process color transparency mask field 324 denotes whether the relevant color separation is transparent or not at the specific coordinate location. The server sends this information along with the other information in the measurement reply data structure. The transparency values are denoted TC, TM, TY, TK corresponding to C, M, Y, K, respectively.

The number of spot colors field 326 represents the number of spot color links included in the reply message. Each spot color is represented by a link or pointer to a buffer holding the spot color separation values. Following the number of spot color links field is a buffer containing one or more spot color pointers labeled spot color link #1 328 through spot color link #N 330.

Figure 9:
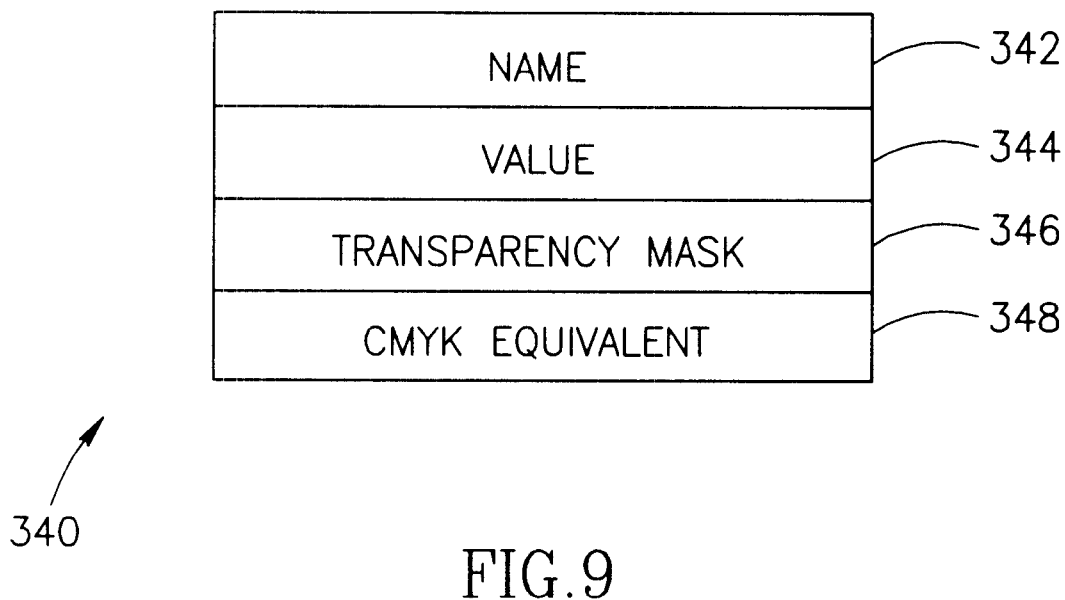
FIG. 9 is a diagram illustrating the densitometer measurement spot color buffer structure portion of the densitometer measurement reply structure in more detail.

A diagram illustrating the densitometer measurement spot color buffer structure portion of the densitometer measurement reply structure in more detail is shown in FIG. 9. The data structure, generally referenced 340, comprises a plurality of fields used to define each spot color buffer pointed to by a spot color link in the server measurement reply message. A spot name field 342 comprises a string indicating the name of the spot color. A spot value field 344 represents the value of the separation expressed as either a percentage or as an absolute value. The spot transparency mask field 346 comprises a value that indicates the degree of transparency of the spot and is expressed as a TS value. The spot CMYK equivalent field 348 comprises the equivalent CMYK values corresponding to the spot. The CMYK equivalent values for a spot color or special color are derived from a combination of process colors that are used for emulating the spot color on a color print proofer or on the computer monitor screen (after conversion from CMYK to RGB).

Color Book Calculation

As described previously, the present invention optionally provides color book information for use by users. This feature is particular useful for those in the print and graphic arts industries. Using a printed color book, the user can match colors displayed on the computer monitor screen with colors produced by the target printing process. The server is operative to provide the exact location of the measured color in the printed color book.

Figure 10A:
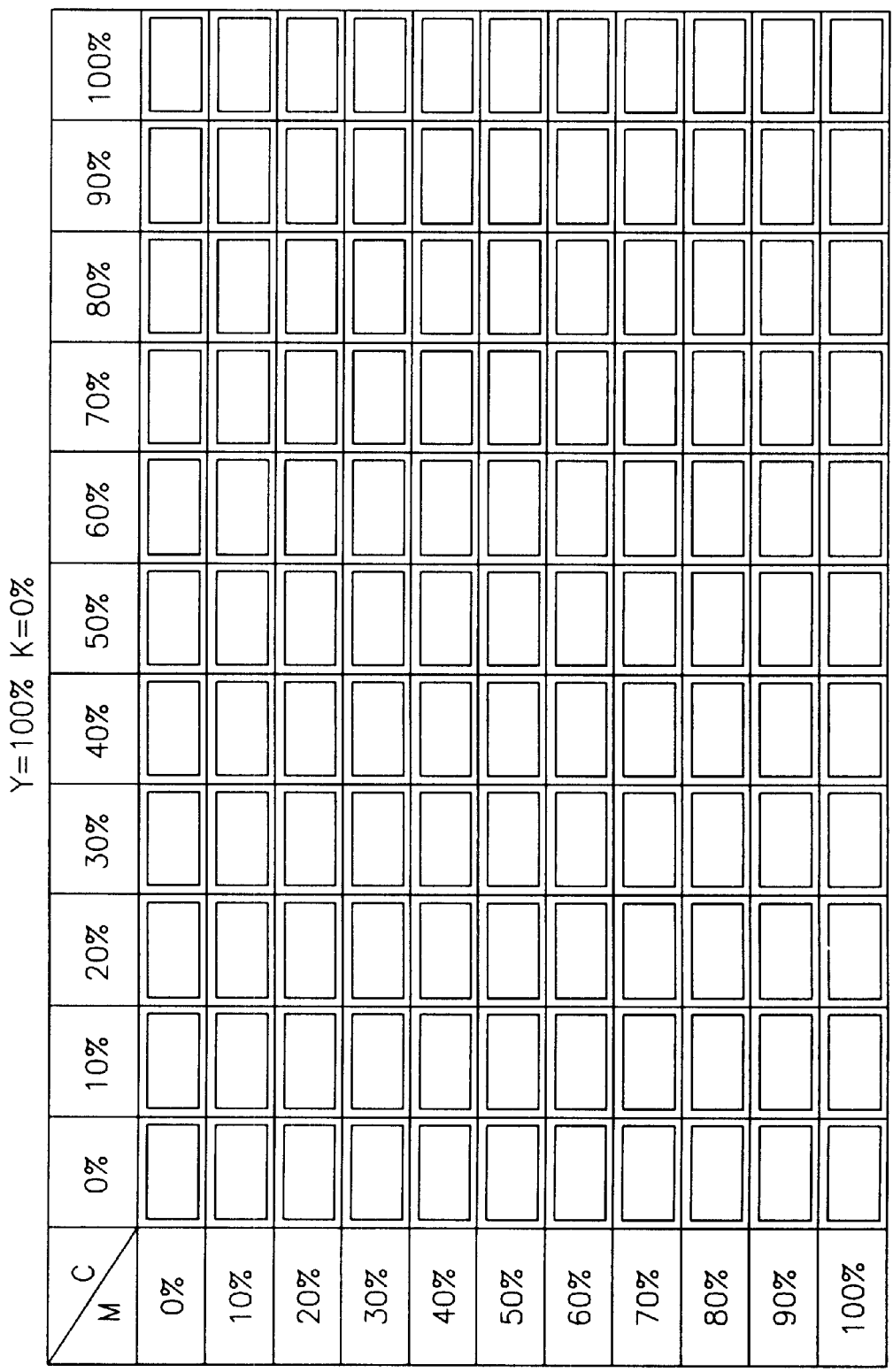

An example page from a color book used in conjunction with the client image workstation is shown in FIGS. 10A and 10B. Two color charts 350, 352 are shown for two different sets of CMYK values. The color book can optionally be supplied with the software application embodying the invention. The color book example provided herein comprises a plurality of color charts or tables wherein the CMYK values are varied in a linear fashion. Each color patch is made up of a different combination of CMYK values. Note that other color book structures are also suitable whereby the color tables CMYK values are varied in a non-linear manner.

The color book comprises a plurality of color patches that are printed using the four primary colors C, M, Y and K. Each primary color is varied from 0 percent to 100 percent in increments of 10% as shown in the Figure. This yields eleven possible values per color component. Therefore, the total number of permutations, i.e., unique color patches, is equal to 11*11*11*11=14,641. These color patches are organized into 121 tables each with 121 color patches. The tables are presented two on each page for a total of 61 pages. The example shown in the Figure illustrates Page 6 from the color book.

Table 350 comprises 121 color patches for Y=100%, K=0% while M and C are varied from 0 to 100% in 10% increments. Similarly, table 352 comprises 121 color patches for Y=0%, K=10% while M and C are varied from 0 to 100% in 10% increments.

Given the CMYK values expressed as a percentage from 0 to 100%, the location in the color book, i.e., page, column and row, is expressed as follows:

Page=1+[(Y div 10)+11*(K div 10)]div 2

Column=1+C div 10

Row=1+{[(Y div 10)+11*(K div 10)]mod 2}*11+(M div 10)

Note that 'div' represents integer division, i.e., any remainder is dropped and 'mod' represents the remainder after performing integer division.

Note further that for most purposes, increments of 10% for the CMYK values is sufficient. If, however, finer increments are required, e.g., 3% or 5%, then additional color patches can be created in a linear fashion. In the equations presented above, the number 11 would be replaced by the total number of possible values per color component. As for non-linear sampling, other types of calculations or look-up table techniques may be needed.

Densitometer Client

Figure 1D:
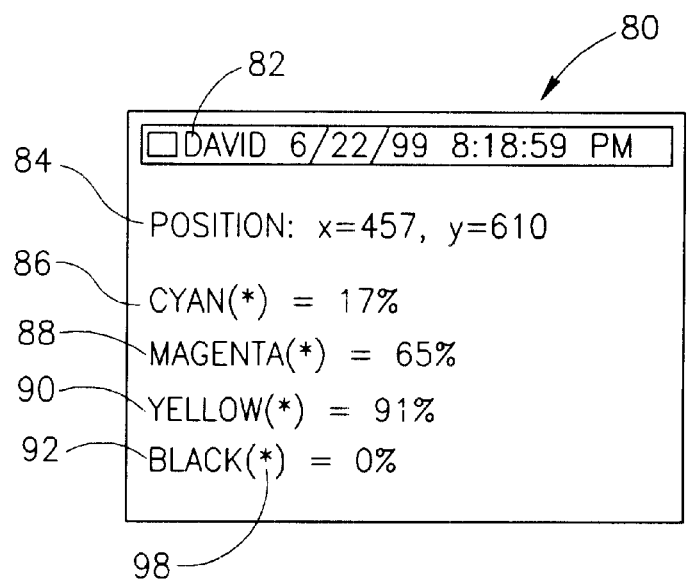

The application that requests and displays color density information from the server is called the Densitometer Client and comprises the web browser 142 (FIG. 3) and Densitometer Plug-In 144. In order to differentiate between measurements and associated notes generated by various users, each user chooses a unique user ID that forms a Measurement Owner Identifier. The Measurement Owner ID is formed from a combination of the chosen user name and user login name used when logging on to the system. The unique Measurement Owner ID is optionally displayed in the densitometer window title bar 82 (FIG. 1D).

Color measurements are associated with specific documents that are stored on the server side. Documents and document aggregations are identified by their Document ID. The Document ID is a unique Universal Resource Locator (URL) on the World Wide Web.

It is important to note that the client portion of the densitometer system of the present invention is not limited to implementation via a web browser and associated plug-in. The invention can be implemented using any suitable means including, but not limited to, stand alone clients that implement the same functionality without the use of a web browser and/or plug-in software component.

Densitometer Server

With reference to FIGS. 2 and 3, the Densitometer Server 158 functions to provide the central image and color density measurement features. In one embodiment of the invention, the Densitometer Server operates in conjunction with an image web server 154. It may access documents that reside in its own file system or those that reside on remote file servers 162 located within the local area network. In addition, the Densitometer Server 158 may access these file servers and file systems by means of network file system protocols (represented by arrow 170). Once accessed, their contents are transmitted to the Densitometer Client applications via TCP/IP protocols over communications means such as a LAN, WAN or the Internet 146. Note that the invention may be implemented to operate over an Intranet, e.g., LAN, or Extranet, e.g., WAN or the Internet.

A Densitometer Session starts when a user logs onto the Image Web Server 154 by supplying a user name (user ID) and password. The Densitometer Server 158 requests this information when the user browses to a protected URL, which is the URL of a document to be viewed and/or to have color density measured. The Densitometer Server 158 associates the user name and password with the IP address of the request for identification purposes later in the Densitometer Session. A session terminates when no activity is sensed by the Densitometer Server 158 for more than a predetermined period of time. Note that no special logout procedure is required to end a Densitometer Session. The document protection mechanism can be set in combination with the web server security and the document file system security.

The Densitometer Server assigns a unique Measurement Serial Number receiving each measurement request. This number serves to uniquely identify each measurement in the system. A Densitometer Event is defined as a message related to a measurement. The system can be configured such that users without sufficient privileges are not permitted to request color density measurements.

It is important to note that the server portion of the densitometer system of the present invention is not limited to implementation using a web server. The invention can be implemented using any suitable means including, but not limited to, a stand-alone HTTP server that implements the same functionality without the use of a web server. In addition, the invention is not limited to any specific client/server protocol implementation, e.g., HTTP.

Densitometer Events

Densitometer Events are exchanged between the server and the clients. Densitometer Clients forward to the Densitometer Server requests for color density information. In response, the Densitometer Server replies with the requested color density information for a particular document. This activity is performed asynchronously and is always initiated by the Densitometer Client in response to the user, i.e., it is user driven.

The Densitometer Server is a process running on a separate computer that communicates with the image web server. Alternatively, the Densitometer Server can be implemented as a process running on the image web server computer. In either case, its functionality is the same. It is responsible for receiving and processing color density reading request events. The protocol utilized by the Densitometer Server is based on the well-known HTTP protocol. The Densitometer Server generates two independent HTTP streams: the first stream is for the displayed document and the second stream is for the color density information. Note again that alternatively, the invention can use any TCP/IP based protocol such as Java rather than HTTP.

The current time is sent (in local client time) as part of the Densitometer Event. The Densitometer Server ignores the locally generated time stamp and records the time (in server time) of arrival for the request event. The time stamp is termed the Densitometer Time Stamp. The Densitometer Server calculates the difference between its own clock and the client clock to obtain the time zone of the client each time a Densitometer Event is initiated at the client side. The time the Densitometer Client displays to the user for each event is the Densitometer Time Stamp that was saved in the Densitometer Server adjusted to the local time zone of the client.

Densitometer Server and Image Database

On the Image Web Server 154, special address aliasing is provided by means of the Densitometer Agent 156. The Densitometer Agent 156 may be implemented as a Web Server Internet Server Application Programming Interface (ISAPI) filter or as a Web Server extension, both techniques being well known in the computer networking arts. All requests to aliased URLs are processed by the Densitometer Agent 156 that in turn transfers the requests to the Densitometer Server 158.

The Densitometer Server 158 may reside in the same computer as the Image Web Server 154 computer or may reside in another computer located on the Local Area Network (LAN). The Densitometer Server 158 functions to receive modified URLs from the Densitometer Agent 156 and provide in return individual documents and their associated annotations (if any were previously created). If a document holds more than one page, the server may provide one page at a time upon client request. Note that the documents may reside in the same file system as the Densitometer Server or in another color image file server 162 accessed over the local area network. The Densitometer Server 158 accesses the Color Image File Server 162 by means of standard Network File System (NFS) protocols (referenced 170).

The Densitometer Server 158 functions to keep track of all color density measurement annotation activity in the Annotation Database 160. The Annotation Database 160 can be implemented in numerous ways. A convenient implementation is to select a standard SQL relational database.

Security and URL Aliases

Access permissions to the Densitometer Server 158 are defined on a per client user basis. As part of the task of administering the system, a directory is created for the user in a folder under the root directory of the web server 154.

The Densitometer Agent 156 maintains two translation tables: a Document Location Table (Table 1) and a Client Access Key Table (Table 2). Both tables are present below.

TABLE 1

Document Location Table

| Alias | Actual Path |
|---|---|
| Archive | D:\Arc |

TABLE 2

Client Access Key Table

| Client Name | Access Key | Location Alias | Sub Path |
|---|---|---|---|
| Acme | Acme_Docs | Archive | Acme_files |

In order to access the system, a client needs to provide the Densitometer Agent Trigger Token as part of the URL. In the example presented herein, this is the token 'densitometer.' This Trigger Token is used by the Image Web Server 154, e.g., Microsoft Internet information Server (IIS), to invoke the filter in the Densitometer Agent 156 to translate the document path specified in the remainder of the URL. The requested URL is as follows below.

Requested URL=http://domain_name/densitometer/Acme_Docs/Subfolder/documentname where domain name='domain name'

Densitometer Agent Trigger Token='densitometer'

Customer Access key='Acme_Docs'

In accordance with the above described location aliasing mechanism, the system may ask users to type in their unique user name and password in order to obtain permission to browse particular locations or file systems in the local area network on the server side. In this manner, users can access their private documents for display and to retrieve color information purposes while not violating the privacy and security of other users of the system.

For example, assuming a Microsoft IIS based Image Web Server that defines 'C:\Inetpub\wwwroot' as the base document root, the Densitometer Server 158 will utilize a sub folder called for example, 'densitometer.' This specific name 'densitometer' would trigger the Densitometer Agent ISAPI filter 156 in the Image Web Server 154 to translate the URL as specified below.

If 'Acme' is a name of a user of the system, a folder named 'Acme_Docs' will be created under the 'C:\Inetpub\wwwroot' directory. This folder is the Client Protected Folder. Using the operating system security flags, only a user named 'Acme' would be given rights to browse this folder.

Client Protected Folder= 'C:\Inetpub\wwwroot\densitometer\Acme'

The Densitometer Agent 156 functions to provide mechanisms for translating URL addresses under the 'Acme_Docs' folder in such a way that logical names can point to physical folders on the same computer or on other computers located in the network. In connection with the example presented above, the Client Document Root physical path is as follows.

Client Document Root physical path='d:\Arc\Acme_files'

The Client Document Root physical path is translated to the following URL.

Translated URL='http://domain_name/densitometer/Acme_Docs'

As a result, the 'Acme' client is granted permission to access any document under her/his Document Root folder. Note that neither the Document Location Table (Table 1) nor the Document Access Key Table (Table 2) is limited in length. Thus, a client may have more than one access key. In addition, there may be more than one alias associated with the same physical folder, each alias providing protection for a different client.

Densitometer Session: Initialization

Figure 11:
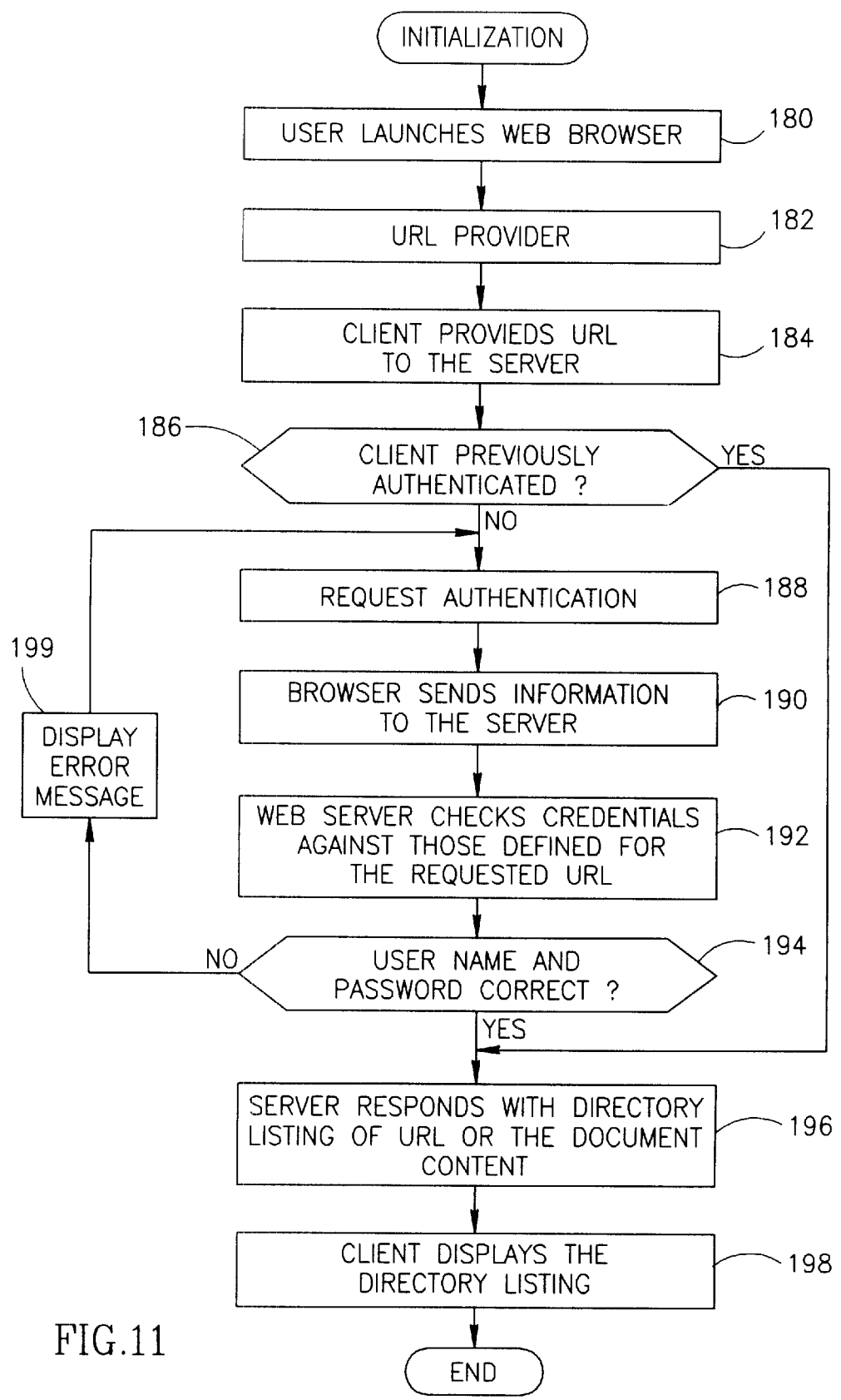
FIG. 11 is a flow diagram illustrating the initialization portion of the client/server color measurement system of the present invention.

The following describes the initialization portion of a Densitometer Session in more detail. A flow diagram illustrating the initialization portion of the client/server color measurement system of the present invention is shown in FIG. 11. Note that the client/server protocol used throughout the session is the HTTP protocol.

The Session starts when the user launches a web browser and provides a URL in the form that was described above. The URL refers to a directory or to a specific document. The document may contain one or more pages. An example of a multi-page document is Adobe Portable Document Format (PDF), although the documents may be conveyed and stored in any suitable format.

Initially, the user launches her/his web browser (step 180). To initiate the initial request, the client, via her/his web browser provides a URL (step 182) which is transmitted to the server (step 184). The server verifies whether the client was already authenticated (step 186). If the client was not previously authenticated, the server requests authentication from the user in response (step 188). To authenticate a user, the browser first displays a dialog to the user, asking for a user name and password. The browser then transmits the user-supplied information to the server (step 190). The web server then checks the credentials submitted against those defined for the requested URL (step 192). The construction of the URL and associated aliases was described previously in the section titled Security and URL Aliases.

If the user name and password provided by the user are not correct (step 194), an error message is displayed (step 199) and the authentication portion is repeated (step 188). The user is then queried again for the correct user name and password. If the user name and password provided by the user are correct (step 194), the server responds with the directory listing of the URL requested by the user or with the contents of a document if the URL was referring to a specific document (step 196).

The client then displays the directory listing in a window within the web browser (step 198). It is likely that the directory contains documents that the user may wish to measure the color of at some point in time. Note that the list of documents sent by the server when browsing is first filtered by the Densitometer Server 158 (FIG. 3) to display only those documents with file types that the Densitometer Server knows how to interpret.

Figure 12:
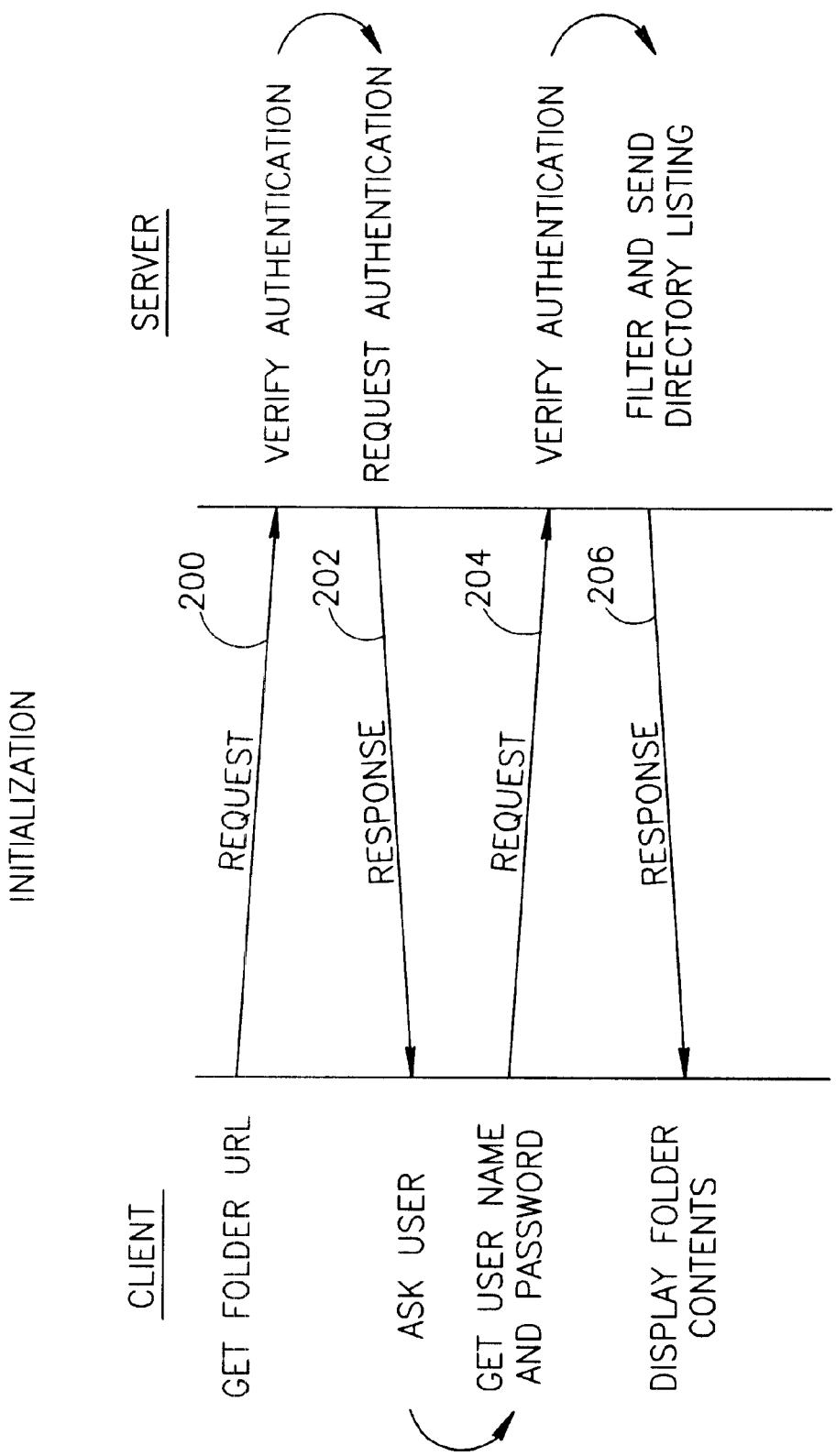
FIG. 12 is a message flow diagram illustrating the transaction sequence between client and server during initialization.

A message flow diagram illustrating the transaction sequence between client and server during initialization is shown in FIG. 12. As described above, the first request (referenced 200) is made by the client with the requested URL to be displayed. The server first verifies the authentication of the user. If no user name or password was submitted, the server responds with an authentication request (referenced 202). Once received by the client, the user is queried for a user name and password. The user-supplied input is sent as another request to the server (referenced 204). The server attempts to verify the authentication and if it passes, the server first filters and then sends the directory listing associated with the requested URL to the client (referenced 206). Upon receiving the directory listing, the client displays its contents in window in the web browser.

Densitometer Session: Browsing

Figure 13:
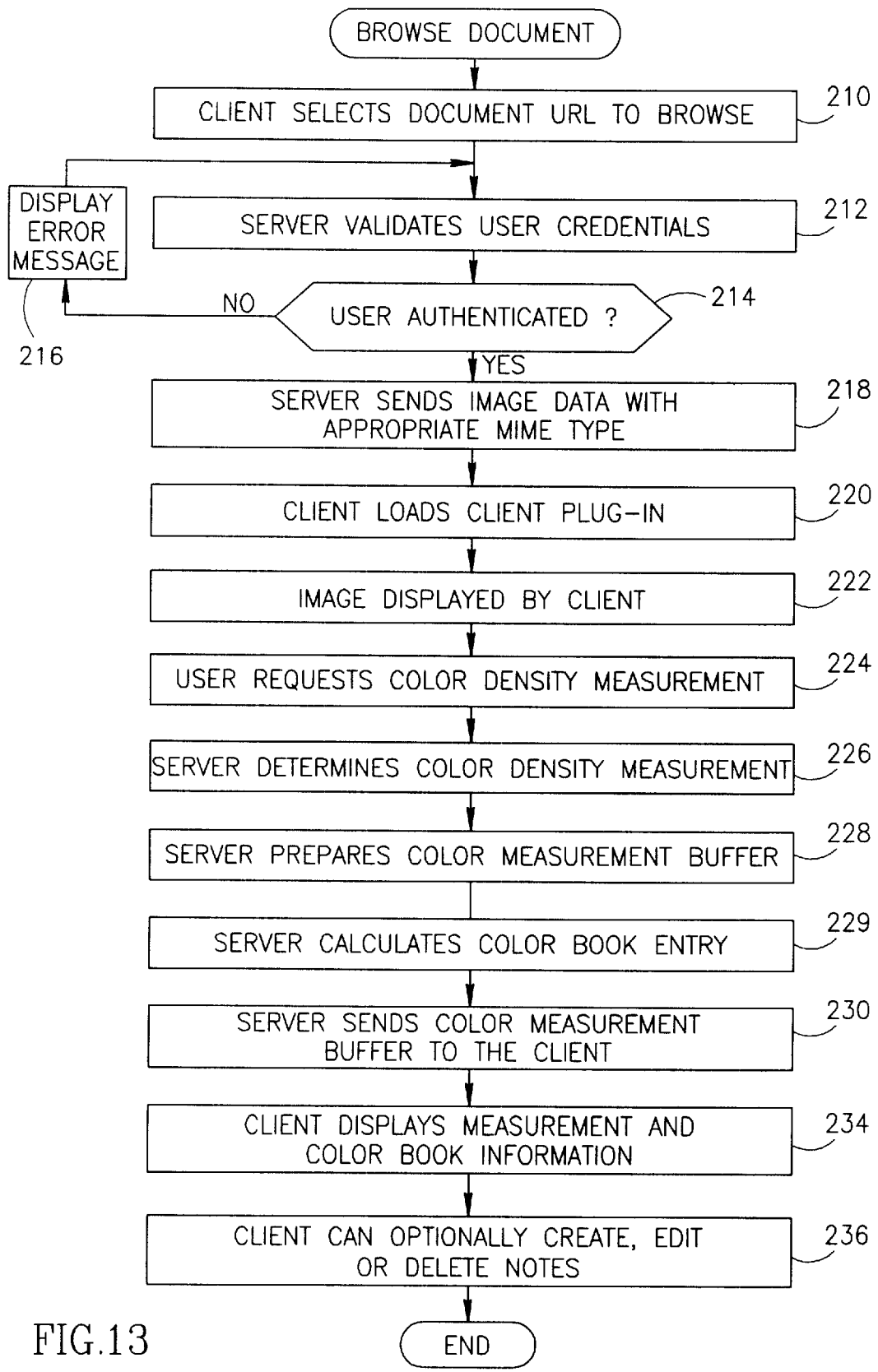
FIG. 13 is a flow diagram illustrating the document browsing portion of the client/server color measurement system of the present invention.

The following describes the browsing portion of a Densitometer Session in more detail. A flow diagram illustrating the document browsing portion of the client/server color measurement system of the present invention is shown in FIG. 13. Note that the client/server protocol used throughout the session is the HTTP protocol.

The client first issues a request to the server to view a particular document by selecting its corresponding document URL (step 210). Before the server responds with the requested data, it needs to validate the user's credentials once again since this request to view a document is considered a new connection to the server (step 212). Assuming the user's name and password were supplied previously, the web browser provides the information automatically, thus avoiding an error message response from the server. If the user is not authenticated (step 214), an error message is returned and displayed on the client browser (step 216). The document is not transmitted to the user until the user is authenticated. The mechanics of user name and password authentication by the server was described in detail previously in the Initialization section.

Once authenticated, the server then responds by sending the document data, i.e., image data in this example, to the client with the proper MIME type (step 218). The MIME type sent to the client in response to the request is unique and is the same for all document types. In response to receiving the MIME type, the web browser at the client, loads the Client Plug-In which comprises the Densitometer Plug-In 144 (FIG. 3) on the client (step 220). The Client Plug-In functions to take control of the browser display window and begin displaying the document (step 222). Note that the document may be of any standard format, e.g., JPEG, GIF, TIFF or BMP. In addition, the document may be of any proprietary document file format. In this case, the message carries a special MIME type which functions to indicate the special document file format.

Some time thereafter, the client issues a request to measure the color density at a specific coordinate location of the screen image (step 224). The URL that is supplied to the server to retrieve the color density information is the same URL corresponding to the underlying document but having a suffix of 'densitometer' appended to it. Upon receiving the appended URL, the server measures the color density values using the method of FIG. 4 and the original document stored in the image database 112 (FIG. 2) for the specified document using the URL as the key for measuring the correct image (step 226).

Once calculated, the server prepares a color measurement buffer with the results of the calculation (step 228). During this step, the server serializes the results and stores them in a response buffer. The server then calculates the corresponding entry in the color book (step 229). This includes the corresponding page, column and row in the color book. Note that alternatively, the color book entry can be calculated by the client. In this case, the client must have knowledge of the specific color book in use for a particular client. The color measurement buffer is then sent as a response to the client (step 230). The response buffer data structure was described in more detail hereinabove.

Upon receipt of the response buffer, the client then displays the results of the color density measurements and the associated color book entry in a window within the web browser (step 234).

If the user has opted to create an annotation containing the results of the color density measurements and optionally the corresponding entry in the color book, the client displays the note similarly overlying the document on the screen (step 236). The user then can modify and delete the note as desired.

Figure 14:
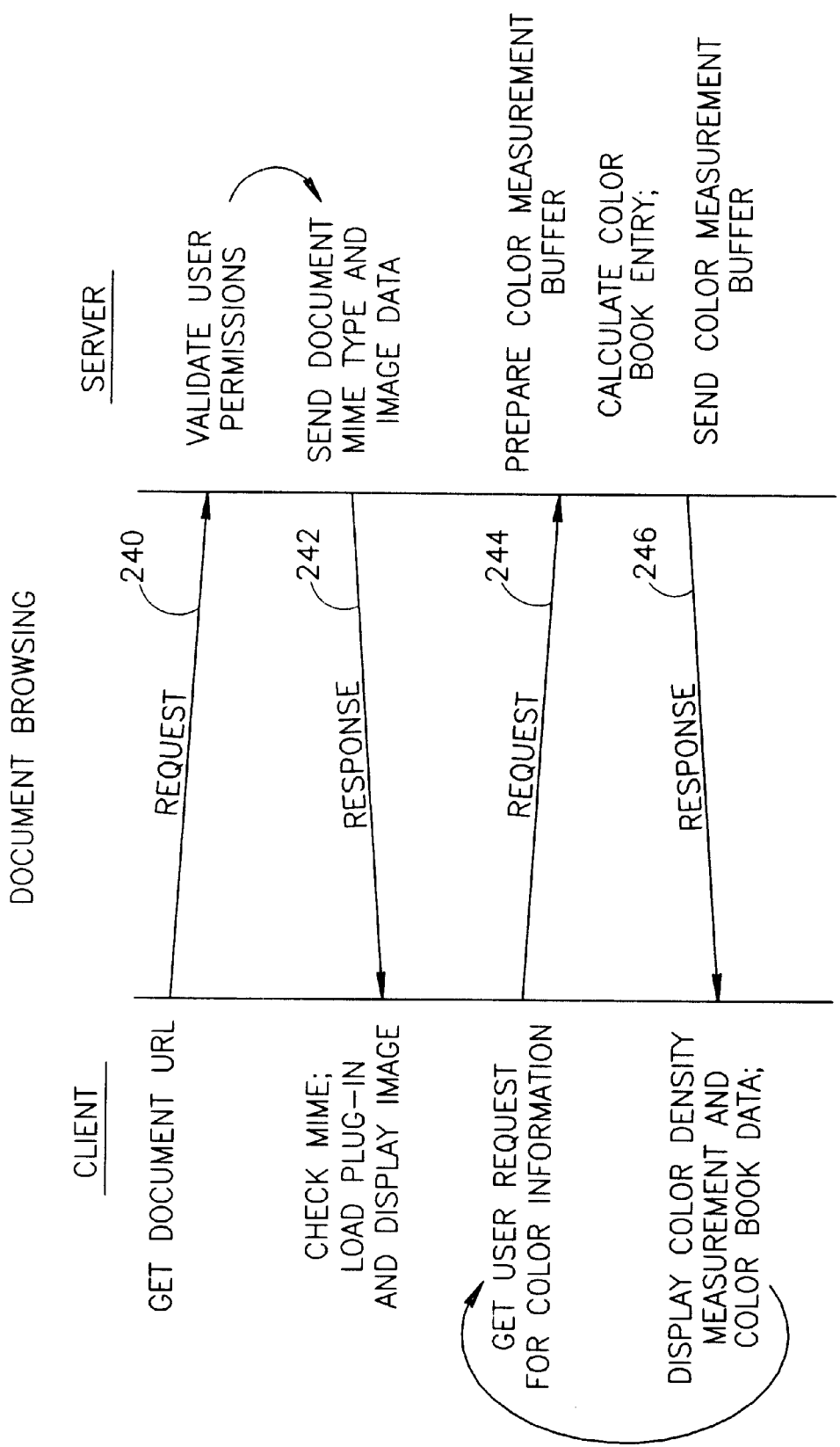
FIG. 14 is a message flow diagram illustrating the transaction sequence between client and server during document browsing.

A message flow diagram illustrating the transaction sequence between client and server during document browsing is shown in FIG. 14. As described previously, the client initiates a document browsing session by sending the document URL request to the server (referenced 240). The server then validates the user permissions including user name and password. Once the user is authenticated, the server responds to the client with the document MIME type and the corresponding document data (image data in this example) (referenced 242).

The client checks the MIME type and, in response, loads one or more plug-ins comprising at least the Densitometer Plug-In into the web browser. Once loaded, the document is displayed in a window in the browser. Then, the user may make any number of requests for color density information associated with a particular X, Y coordinate in the document. The color density is requested from the server by sending the URL corresponding to the document with the text '/densitometer' appended to it (referenced 244). The server measures the color density information using the original document and calculates the corresponding entry in the color book currently in use on the client. Note that as described previously, there may be more than one color book. The results are serialized and placed in a color measurement buffer. The color measurement buffer is then transmitted to the client (referenced 246). The client receives the buffer and displays the color density measurement results and color book entry in a window in the browser.

While the invention has been described with respect to a limited number of embodiments, it will be appreciated that many variations, modifications and other applications of the invention may be made.

What is claimed is:

1. A client/server based color density measurement system, comprising:

an original document stored in a document file in an image database on a server coupled to a network, said document file for storing a digital representation of a document;

one or more clients each in communication with a server over a network, each client operative to locally display a representation of said original document stored remotely on said server, to accept requests from a user for color density measurements at specific coordinate locations in said original document and to present results of color density measurements received from said server to said user; and said server operative to receive said requests for color density measurements from said one or more clients over said network and in response thereto, retrieve color density information from said original document and send said color density information to said clients for presentation to said user.

2. The system according to claim 1, further comprising means for measuring and displaying color density information relating to spot colors and their CMYK equivalent used within said original document.

3. The system according to claim 1, further comprising means for recording color density measurement results in a note associated with said original document file.

4. The system according to claim 1, further comprising means for calculating an entry in a color book whereby a color patch in said color book is selected that corresponds to the color density measurement results returned by said server.

5. The system according to claim 4, wherein said means for calculating an entry in a color book is implemented on said server.

6. The system according to claim 4, wherein said means for calculating an entry in a color book is implemented on said one or more clients.

7. The system according to claim 1, wherein said server and said client comprise means for obtaining color density information of an original document that has not yet been fully displayed by said client.

8. The system according to claim 1, wherein said server is adapted to vary the number of pixels used to measure the color density in accordance with the ratio between the number of pixels displayed on a monitor associated with said client and the corresponding number of pixels in said original document stored on said server.

9. The system according to claim 1, wherein said client is adapted to display the results of the color density measurement with an indication that said result is not accurate in the event the zoom factor is other than 1:1.

10. The system according to claim 1, wherein said client is adapted to display an indication of the transparency of a particular color separation or element of said document.

11. The system according to claim 1, wherein said client comprises:
   a computer display monitor;
   network communication means;
   a processor suitably programmed to:
      run a web browser application; and
      a client plug-in adapted to run within said web browser, said client plug-in operative to locally display a representation of said original document remotely stored on said server in said document file and to permit a user to measure and display color density of said original document at a specific coordinate location.

12. The system according to claim 1, wherein said network comprises the Internet.

13. The system according to claim 1, wherein said network comprises an Intranet.

14. The system according to claim 1, wherein said network comprises a Wide Area Network (WAN).

15. The system according to claim 1, wherein said network comprises a TCP/IP based network.

16. The system according to claim 1, wherein said server comprises
   network communication means;
   a processor suitably programmed to:
      provide web server services;
      provide densitometer agent services; and
      to measure color density information from said original document in response to a request received from a client over said network, said server sending via said network the results of the color density measurement to said client for display to said user.

17. The system according to claim 16, wherein said densitometer agent services comprises an Internet Server Application Programming Interface (ISAPI).

18. The system according to claim 1, wherein said server is adapted to receive said color density measurement requests from said one or more clients and respond to said requests utilizing the Hypertext Transport Protocol (HTTP).

19. The system according to claim 1, further comprising security means for providing Universal Resource Locator (URL) translation and redirection services so as to provide user level security for documents and notes stored on said server.

20. The system according to claim 19, wherein said security means comprises a Document Location Table and a Client Access Key Table.

21. The system according to claim 1, wherein said document comprises an image.

22. The system according to claim 1, wherein said document is represented using a page description language.

23. The system according to claim 1, wherein said representation of said original document displayed on said client comprises a compressed document.

24. The system according to claim 1, wherein said representation of said original document displayed on said client comprises a non-compressed document.

25. The system according to claim 1, further comprising means for retrieving and displaying color density information relating to spot colors and their LAB equivalent used within said original document.

26. In a client/server system coupled to a network, a method of measuring the color density of a document, comprising the steps of:
   storing an original document as a digital representation of a document in a document file in an image database on a server coupled to a network;
   displaying locally on one or more clients in communication with said server over said network a representation of said original document remotely stored on said server;
   accepting a request from a user to measure color density of said original document at a specific coordinate location;
   retrieving color density information from said original document in response to said request received from a client over said network; and
   sending said color density information to said client over said network for display to said user.

27. The method according to claim 26, further comprising the step of measuring and displaying color density information relating to spot colors and their CWYK equivalent used within said original document.

28. The method according to claim 26, further comprising the step of recording color density measurement results in a note associated with said original document file.

29. The method according to claim 26, further comprising the step of said client calculating an entry in a color book whereby a color patch in said color book is selected that corresponds to the color density measurement results returned by said server.

30. The method according to claim 26, further comprising the step of said server calculating an entry in a color book whereby a color patch in said color book is selected that corresponds to the color density measurement results returned by said server.

31. The method according to claim 26, wherein color density information of said original document is measured while the document has not yet been fully displayed by said client.

32. the method according to claim 26, wherein said step of measuring color density information comprises the step of varying the number of pixels used to measure the color density in accordance with the ratio between the number of pixels displayed on a monitor associated with said client and the corresponding number of pixels in said original document stored on said server.

33. The method according to claim 26, further comprising the step of displaying the results of the color density measurement with an indication that said result is not accurate in the event the zoom factor is other than 1:1.

34. The method according to claim 26, further comprising the step of displaying an indication of the transparency of a particular color separation to element of said document.

35. The method according to claim 26, further comprising the step of said server receiving said color density measurement requests from said one or more clients and responding to said requests utilizing the Hypertext Transport Protocol (HTTP).

36. The method according to claim 26, further comprising the step of providing Universal Resource Locator (URL) translation and redirection services so as to provide user level security for documents and notes stored on said server.

37. The method according to claim 26, wherein said step of displaying locally a representation of said original document on said client comprises transmitting a compressed document from said server to said client.

38. The method according to claim 26, wherein said step of displaying locally a representation of said original document on said client comprises transmitting a non-compressed document from said server to said client.

39. The method according to claim 26, further comprising the step of retrieving and displaying color density information relating to spot colors and their LAB equivalent used within said original document.

40. A server based color density measurement system, comprising:

means for storing digital representations of a plurality of original documents in an image database;

means for receiving requests for color density measurements from a plurality of clients in communication with said server over a network;

means for retrieving color density information from said original documents in response to said requests; and means for sending said color density information to respective requesting clients over said network.

41. A computer program product for use in the client side of a color density measuring system, said computer program product comprising:

a computer usable medium having computer readable program code means embodied in said medium for measuring color density information of an original document stored remotely in an image file database on a server, said computer program product comprising:

computer readable program code means for locally displaying a representation of an original document remotely stored on a server in communication with said client over a network;

computer readable program code means for accepting user requests for color density measurements of said original document at specific coordinate locations;

computer readable program code means for sending said user requests to said server over said network;

computer readable program code means for receiving color density information retrieved by said server over said network; and computer readable program code means for presenting said retrieved color density information to said user.

42. A computer program product for use in a server side of a color density measuring system, said computer program product comprising:

a computer usable medium having computer readable program code means embodied in said medium for measuring color density information of an original document, said computer program product comprising:

computer readable program code for storing digital representations of a plurality of original documents in an image database;

computer readable program code for receiving requests for color density measurements from a plurality of clients in communication with said server over a network;

computer readable program code for retrieving color density information from said original documents in response to said requests; and computer readable program code for sending said color density information to respective requesting clients over said network.

43. A method in a computer system for communicating color density information of an original document stored remotely on a server, said server in communication with said system over a network, said method comprising the steps of:

presenting a densitometer icon to a user which when pressed displays a densitometer window for showing color density measurements;

presenting the coordinates of a location whose color density is to be measured as selected by said user; and presenting color density information received from said server in said densitometer window.

44. A client based color density measurement system, comprising:

means for locally displaying a representation of an original document remotely stored on a server in communication with said client over a network;

means for accepting user requests for color density measurements of said original document at specific coordinate locations;

means for sending said user requests to said server over said network;

means for receiving color density information retrieved by said server over said network; and means for presenting said retrieved color density information to said user.

\* \* \* \* \*